US012346061B2

(12) United States Patent
Shimizu et al.

(10) Patent No.: US 12,346,061 B2
(45) Date of Patent: Jul. 1, 2025

(54) DEVELOPING DEVICE PROVIDED WITH A TONER TRAPPING MECHANISM

(71) Applicant: KYOCERA Document Solutions Inc., Osaka (JP)

(72) Inventors: Tamotsu Shimizu, Osaka (JP); Hiroshi Yamazaki, Osaka (JP); Kenichi Tamaki, Osaka (JP); Junichi Nakagawa, Osaka (JP); Takuji Watanabe, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 18/521,156

(22) Filed: Nov. 28, 2023

(65) Prior Publication Data

US 2024/0176271 A1 May 30, 2024

(30) Foreign Application Priority Data

Nov. 30, 2022 (JP) ................................ 2022-191059

(51) Int. Cl.
*G03G 21/20* (2006.01)
*G03G 15/00* (2006.01)
(Continued)

(52) U.S. Cl.
CPC ....... *G03G 21/206* (2013.01); *G03G 15/0121* (2013.01); *G03G 15/0887* (2013.01); *G03G 15/0896* (2013.01); *G03G 15/0898* (2013.01); *G03G 15/095* (2013.01); *G03G 15/50* (2013.01); *G03G 21/0052* (2013.01);
(Continued)

(58) Field of Classification Search
CPC ............ G03G 15/0121; G03G 15/095; G03G 15/0896; G03G 15/0898; G03G 15/50; G03G 21/0052; G03G 21/206; G03G 2221/0021; G03G 2221/0094; G03G 2221/1645; G03G 15/0887
See application file for complete search history.

(56) References Cited

U.S. PATENT DOCUMENTS

| | | | | |
|---|---|---|---|---|
| 2014/0205311 | A1* | 7/2014 | Kashimoto | G03G 15/0898 399/98 |
| 2014/0294429 | A1 | 10/2014 | Inui et al. | 399/99 |
| 2018/0032024 | A1* | 2/2018 | Yamashita | G03G 21/10 |

FOREIGN PATENT DOCUMENTS

| | | |
|---|---|---|
| JP | 2014-191342 A | 10/2014 |

* cited by examiner

*Primary Examiner* — Joseph S Wong
(74) *Attorney, Agent, or Firm* — Stein IP, LLC

(57) ABSTRACT

The image forming apparatus includes a developing part and a vibration generating part. The vibration generating part vibrates a filter provided in the developing part. The developing part includes a development container, a developer carrier, and a toner trapping mechanism. The development container includes a first conveyance chamber and a second conveyance chamber placed in parallel juxtaposition. The toner trapping mechanism has a duct, an air inlet port, an air exhaust port, and a filter. The air inlet port is opened along the longitudinal direction of the second conveyance chamber so as to allow air present in the second conveyance chamber to flow into the duct. The vibration generating part is placed outside the developing part so as to be opposed to the development container and positioned on a downstream side in a developer conveyance direction of the second conveyance chamber.

11 Claims, 13 Drawing Sheets

(51) Int. Cl.

*G03G 15/01* (2006.01)
*G03G 15/08* (2006.01)
*G03G 15/095* (2006.01)
*G03G 21/00* (2006.01)

(52) U.S. Cl.

CPC ............... *G03G 2221/0021* (2013.01); *G03G 2221/0094* (2013.01); *G03G 2221/1645* (2013.01)

DEVELOPING DEVICE PROVIDED WITH A TONER TRAPPING MECHANISM

INCORPORATION BY REFERENCE

This application is based on and claims the benefit of priority from Japanese Patent Application No. 2022-191059 filed on Nov. 30, 2022, the contents of which are hereby incorporated by reference.

BACKGROUND

The present disclosure relates to an image forming apparatus.

In an image forming apparatus of electrophotographic system such as copiers and printers, there has been widely used a device for forming a toner image, which is to be transferred onto a paper sheet in later process, by feeding toner and executing development for an electrostatic latent image formed on an outer circumferential surface of a photosensitive drum or other image carrier. In order to enable continuous formation of uniform images, the image forming apparatus conveys toner-containing developer contained in a development container while stirring the developer in the development container.

With conventional image forming apparatuses, there has been a fear that toner may scatter from inside to outside of the development container, causing apparatus inside to be contaminated with the scattered toner.

SUMMARY

An image forming apparatus according to one aspect of the present disclosure includes an image carrier, a charging part, a developing part, a cleaning part, a voltage application part, a vibration generating part, and a controller. The image carrier has an electrostatic latent image formed on its outer circumferential surface. The charging part electrically charges the outer circumferential surface of the image carrier. The developing part feeds toner to the outer circumferential surface of the image carrier. The cleaning part cleans the outer circumferential surface of the image carrier. The voltage application part applies a developing voltage to a developer carrier. The vibration generating part vibrates a filter provided in the developing part. The controller controls the image carrier, the charging part, the developing part, the cleaning part, the voltage application part, and the vibration generating part. The developing part includes a development container, a first conveyance member and a second conveyance member, the developer carrier, and a toner trapping mechanism. The development container includes a first conveyance chamber and a second conveyance chamber which are placed in parallel juxtaposition so as to be communicated with each other at their longitudinal both end portions and in which a toner-containing developer to be fed to the image carrier is contained. The first conveyance member and the second conveyance member are rotatably supported by the first conveyance chamber and the second conveyance chamber, respectively, and convey and circulate the developer, while stirring the developer, in mutually opposite directions of the longitudinal direction. The developer carrier is rotatably supported by the development container in opposition to the image carrier, and feeds the toner contained in the second conveyance chamber to the image carrier. The toner trapping mechanism traps the toner contained in the second conveyance chamber. The toner trapping mechanism includes a duct, an air inlet port, an air exhaust port, a filter, and a fan. The duct is connected to the second conveyance chamber and allows air present in the second conveyance chamber to flow therethrough. The air inlet port is a connecting portion between the duct and the second conveyance chamber and is placed upward of the developer carrier and opened along the longitudinal direction of the second conveyance chamber so as to allow air present in the second conveyance chamber to flow into the duct. The air exhaust port is placed at a downstream end in an airflow direction of air flowing in through the air inlet port of the duct so as to allow air in the duct to flow out therethrough. The filter traps the toner contained in air flowing through the duct. The fan allows air present in the second conveyance chamber to be sucked into the duct and let to flow outside. The vibration generating part is placed outside the developing part so as to be opposed to the development container and positioned on a downstream side in a developer conveyance direction of the second conveyance chamber.

DETAILED DESCRIPTION

Hereinbelow, an embodiment of the present disclosure will be described with reference to the accompanying drawings. It is to be noted that the present disclosure is not limited to the following contents.

Figure 1:
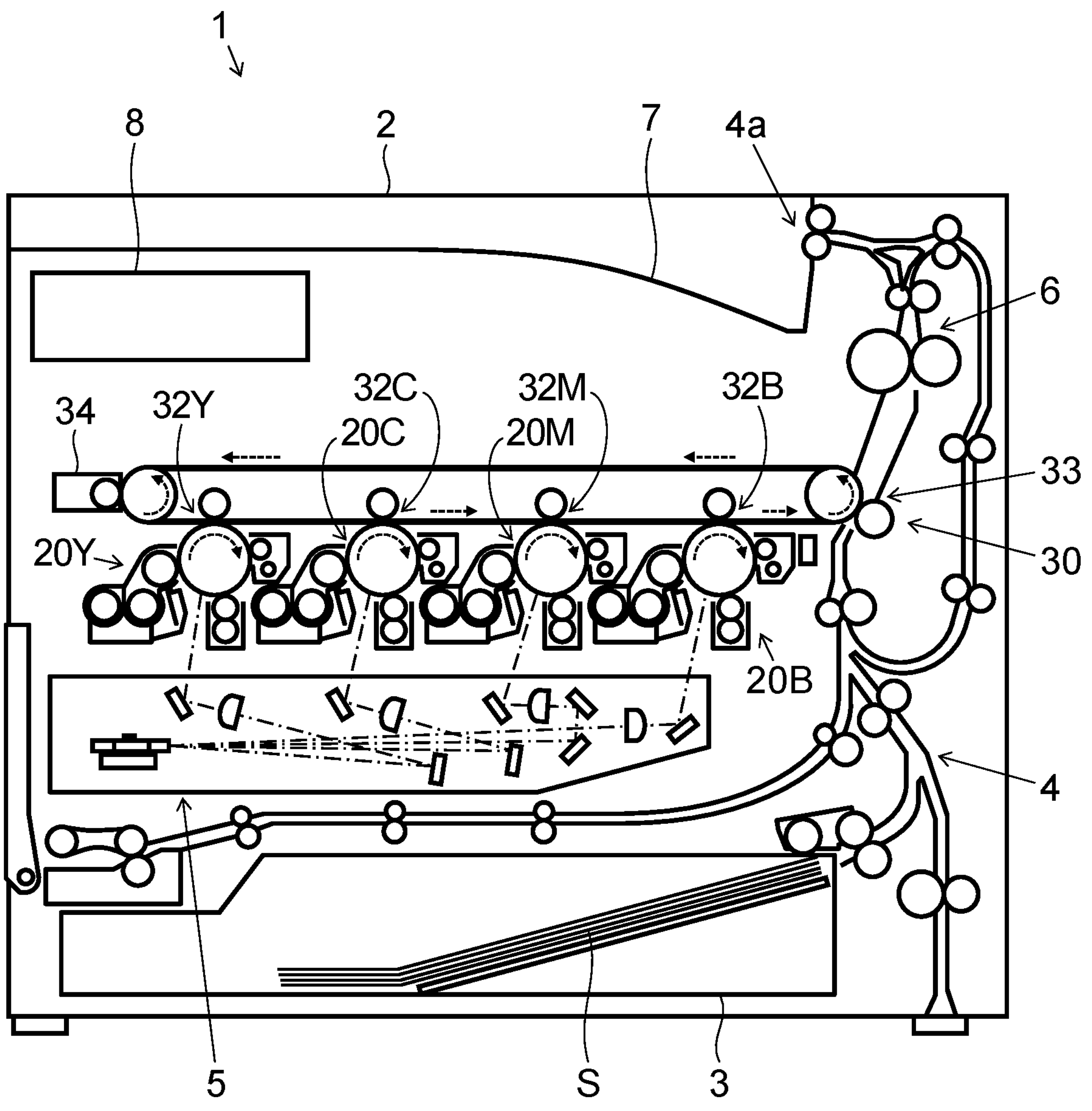
FIG. 1 is a schematic cross-sectional front view of an image forming apparatus according to one embodiment of the present disclosure.
Figure 2:
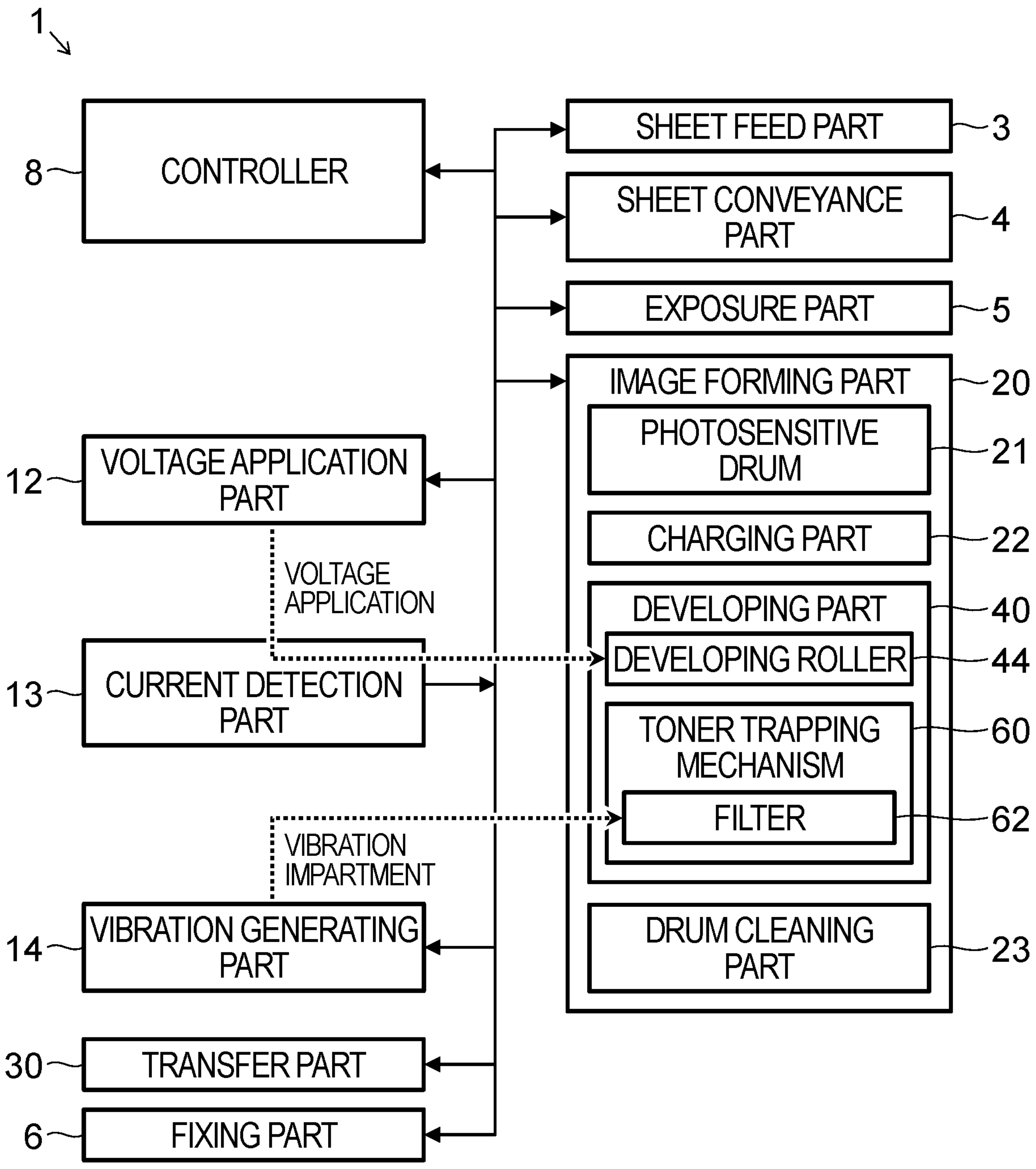
FIG. 2 is a block diagram showing a configuration of the image forming apparatus of FIG. 1.
Figure 3:
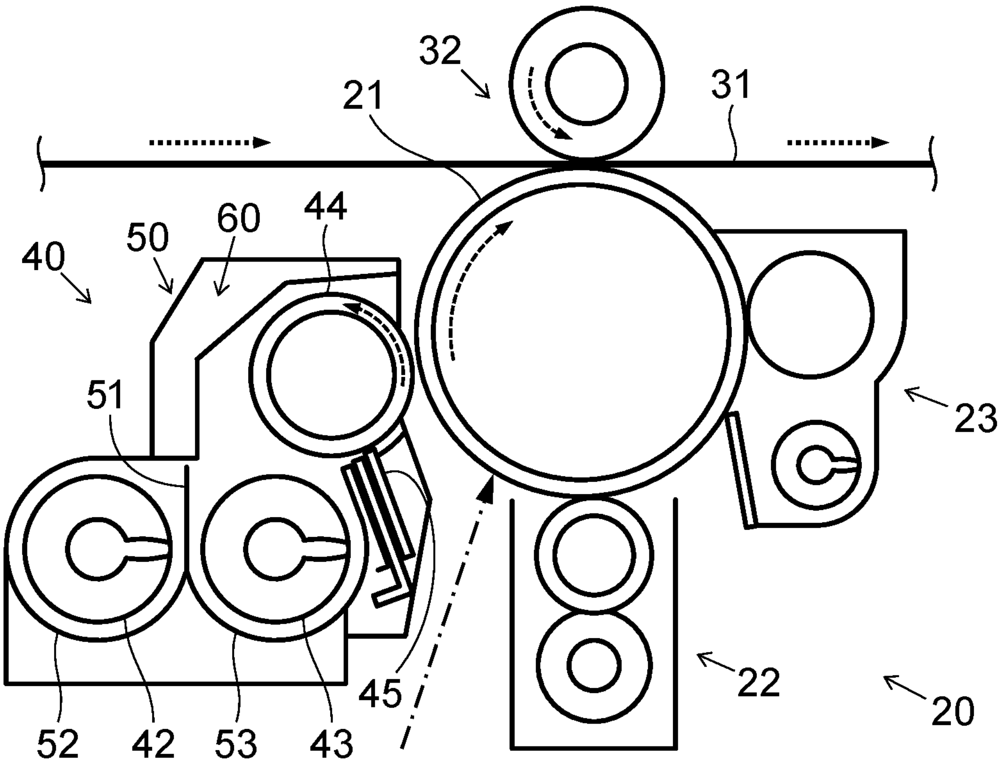
FIG. 3 is a schematic cross-sectional front view of around an image forming part in the image forming apparatus of FIG. 1.

FIG. 1 is a schematic cross-sectional front view of an image forming apparatus 1 according to this embodiment. FIG. 2 is a block diagram showing a configuration of the image forming apparatus 1 of FIG. 1. FIG. 3 is a schematic cross-sectional front view of around an image forming part 20 in the image forming apparatus 1 of FIG. 1. An example of the image forming apparatus 1 of the embodiment is a tandem-type color printer in which a toner image is transferred onto a paper sheet S by using an intermediate transfer belt 31. The image forming apparatus 1 may also be a so-called multifunction peripheral equipped with such functions as printing, scanning (image reading), and facsimile transmission.

As shown in FIGS. 1, 2 and 3, the image forming apparatus 1 includes a sheet feed part 3, a sheet conveyance part 4, an exposure part 5, image forming parts 20, a transfer part 30, a fixing part 6, a sheet discharge part 7, and a controller 8, as these are provided in an apparatus housing 2.

The sheet feed part 3 is placed at a bottom portion of the housing 2. The sheet feed part 3, containing a plurality of unprinted paper sheets S, separates a sheet S therefrom and feeds out the sheet S one by one on occasions of printing. The sheet conveyance part 4 extends in an up/down direction along a side wall of the housing 2. The sheet conveyance part 4 conveys the sheet S, which has been fed out from the sheet feed part 3, to a secondary transfer part 33 and the fixing part 6, and further discharges the after-fixation sheet S through a sheet discharge port 4*a* to the sheet discharge part 7. The exposure part 5 is placed above the sheet feed part 3. The exposure part 5 applies laser light, which has been controlled based on image data, toward the image forming parts 20.

The image forming parts 20 are placed above the exposure part 5 and below the intermediate transfer belt 31. The image forming parts 20 include a yellow-destined image forming part 20Y, a cyan-destined image forming part 20C, a magenta-destined image forming part 20M, and a black-destined image forming part 20B. These four image forming parts 20 are identical in basic configuration. Therefore, hereinafter, unless otherwise necessarily particularly limited, the identification signs 'Y', 'C', 'M' and 'B' representing individual colors, respectively, may be omitted from time to time.

Each image forming part 20 includes a photosensitive drum (image carrier) 21 which is supported rotatable in a specified direction (clockwise in FIGS. 1 and 3). The image forming part 20 further includes a charging part 22, a developing part 40, and a drum cleaning part (cleaning part) 23, as these are disposed around the photosensitive drum 21 along its rotational direction. In addition, a primary transfer part 32 is placed between the developing part 40 and the drum cleaning part 23.

The photosensitive drum 21, which is formed into a horizontally-extending cylindrical shape, has, on its outer circumferential surface, a photosensitive layer formed from amorphous silicon photoconductor, as an example. The charging part 22 electrically charges the surface (outer circumferential surface) of the photosensitive drum 21 to a specified potential. The exposure part 5 illuminates the outer circumferential surface of the photosensitive drum 21 charged by the charging part 22 so that an electrostatic latent image of an original image is formed on the outer circumferential surface of the photosensitive drum 21. The developing part 40 feeds toner to the electrostatic latent image and makes development to form a toner image. The four image forming parts 20 form toner images of different colors, respectively. After a toner image is primarily transferred onto an outer circumferential surface of the intermediate transfer belt 31, the drum cleaning part 23 removes toner and the like remaining on the outer circumferential surface of the photosensitive drum 21, thus fulfilling cleaning function. In this way, the image forming part 20 forms an image (toner image) that is to be transferred onto the sheet S in later process.

The transfer part 30 includes the intermediate transfer belt 31, primary transfer parts 32Y, 32C, 32M, 32B, a secondary transfer part 33, and a belt cleaning part 34. The intermediate transfer belt 31 is placed above the four image forming parts 20. The intermediate transfer belt 31 is an endless intermediate transferer which is supported so as to be turnable in a specified direction (counterclockwise in FIG. 1) and to which toner images formed by the four image forming parts 20, respectively, are primarily transferred in superimposition one after another. The four image forming parts 20 are placed in such a so-called tandem mode as to be arrayed in one line from upstream side toward downstream side of the turning direction of the intermediate transfer belt 31.

The primary transfer parts 32Y, 32C, 32M, 32B are placed upward of the individual-color image forming parts 20Y, 20C, 20M, 20B, respectively, with the intermediate transfer belt 31 pinched therebetween. The secondary transfer part 33 is placed upstream of the fixing part 6 as viewed in a sheet conveyance direction of the sheet conveyance part 4, as well as downstream of the four image forming parts 20Y, 20C, 20M, 20B as viewed in the turning direction of the intermediate transfer belt 31. The belt cleaning part 34 is placed downstream of the secondary transfer part 33 as viewed in the turning direction of the intermediate transfer belt 31.

The primary transfer part 32 transfers toner images, which have been formed on the outer circumferential surfaces of the photosensitive drums 21, onto the intermediate transfer belt 31. In other words, the toner images are primarily transferred onto the outer circumferential surface of the intermediate transfer belt 31 at the individual-color primary transfer parts 32Y, 32C, 32M, 32B, respectively. Thus, by the toner images of the four image forming parts 20 being transferred successively in superimposition at specified timings along with the turning of the intermediate transfer belt 31, a color toner image in which four-color toner images of yellow, cyan, magenta and black have been superimposed together is formed on the outer circumferential surface of the intermediate transfer belt 31.

The color toner image on the outer circumferential surface of the intermediate transfer belt 31 is transferred onto the sheet S fed in synchronization by the sheet conveyance part 4 at a secondary transfer nip portion formed in the secondary transfer part 33. The belt cleaning part 34 removes toner and other deposits remaining on the outer circumferential surface of the intermediate transfer belt 31 after secondary transfer, fulfilling the cleaning function. In this way, the transfer part 30 transfers (records) the toner image, which has been formed on the outer circumferential surface of the photosensitive drum 21, onto the sheet S.

The fixing part 6 is placed upward of the secondary transfer part 33. The fixing part 6 heats and pressurizes the sheet S, onto which the toner image has been transferred, so as to fix the toner image on the sheet S.

The sheet discharge part 7 is placed above the transfer part 30. The sheet S, on which the toner image has been fixed and for which printing is over, is conveyed to the sheet discharge part 7. The sheet discharge part 7 allows an after-printing sheet (printed matter) to be taken out from upward.

The controller 8 includes a CPU, an image processing part, a storage part, and other electronic circuits and electronic components (none shown). The CPU, based on control programs and data stored in the storage part, controls operations of the individual component elements provided in the image forming apparatus 1 to execute processing related to functions of the image forming apparatus 1. The sheet feed part 3, the sheet conveyance part 4, the exposure part 5, the image forming parts 20, the transfer part 30 and the fixing part 6 receive instructions individually from the controller 8 to fulfill printing on the sheet S in linkage with one another. The storage part is made up by a combination of nonvolatile storage device such as program ROM (Read Only Memory), data ROM, or the like and volatile storage device such as RAM (Random Access Memory).

Also, the image forming apparatus 1, as shown in FIG. 2, further includes a voltage application part 12 and a current detection part 13.

The voltage application part 12 includes a power supply part and a control circuit, as an example (neither shown). The voltage application part 12 is electrically connected to a later-described developing roller (developer carrier) 44 of the developing part 40. The voltage application part 12 applies a developing voltage (developing bias) to the developing roller 44. Via the voltage application part 12, the controller 8 controls application timing, voltage value, polarity, application time or the like of the developing voltage applied to the developing roller 44.

Under application of the developing voltage to the developing roller 44, the current detection part 13 detects an electric current flowing between the photosensitive drum 21 and the developing roller 44. From the current detection part 13, the controller 8 receives information as to the current detected by the current detection part 13.

Figure 4:
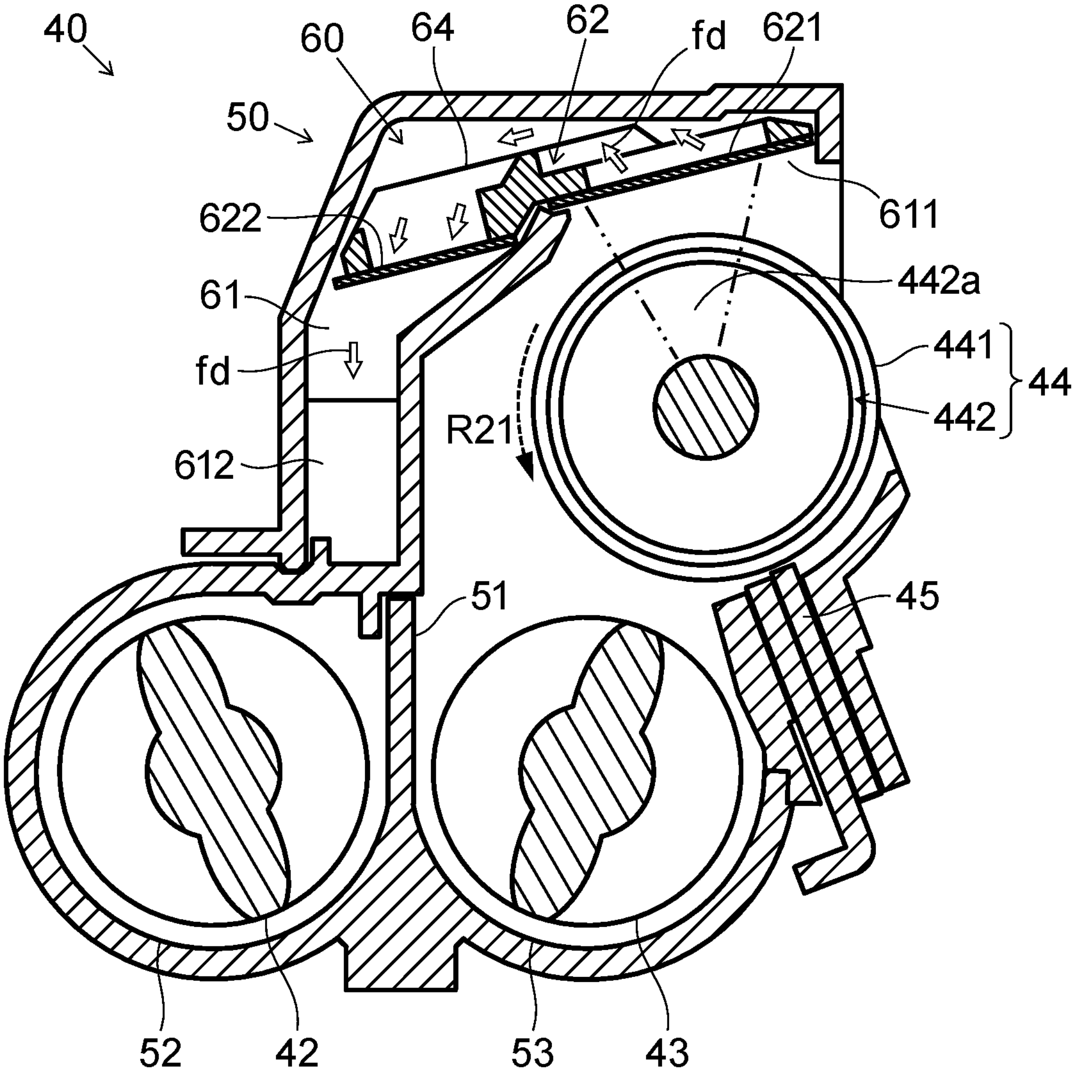
FIG. 4 is a vertical cross-sectional front view of a developing part in the image forming part of FIG. 3.
Figure 5:
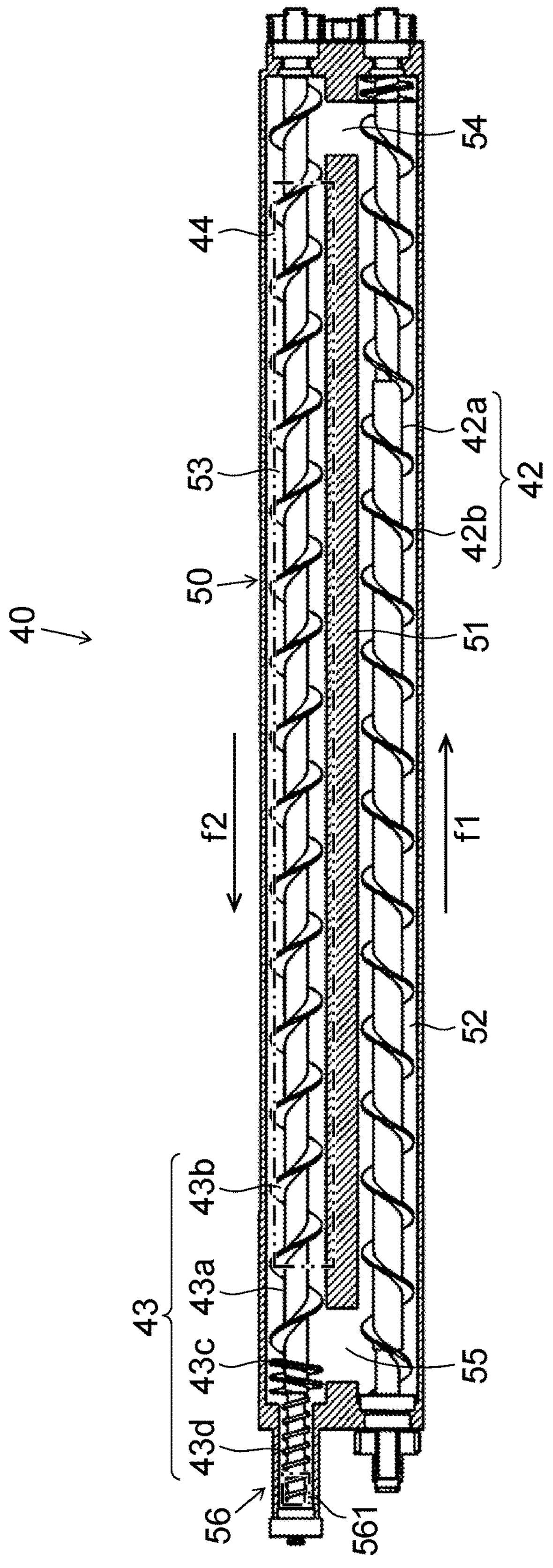
FIG. 5 is a horizontal cross-sectional plan view of the developing part in the image forming part of FIG. 3.
Figure 6:
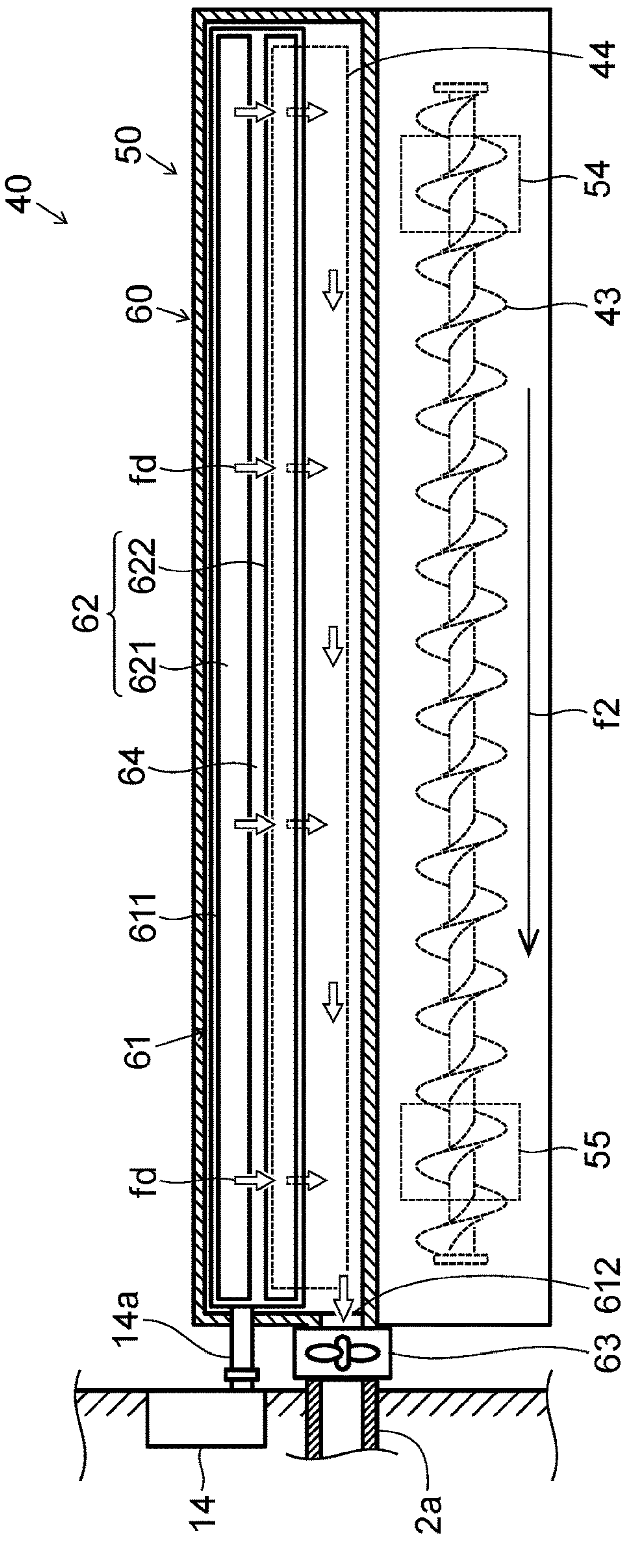
FIG. 6 is a vertical cross-sectional side view of the developing part in the image forming part of FIG. 3.

Next, a configuration of the developing part 40 will be described with reference to FIGS. 4, 5 and 6 in addition to FIGS. 2 and 3. FIGS. 4, 5 and 6 are a vertical cross-sectional front view, a horizontal cross-sectional plan view, and a vertical cross-sectional side view of the developing part 40 in the image forming part 20 of FIG. 3. In addition, the individual-color developing parts 40 are identical in basic configuration and, therefore, expression and explanation of identification signs representing the individual colors with respect to the component elements are omitted. Also, in the following description, the terms 'axial direction' refers to an axial direction (drawing-sheet depthwise direction in FIGS. 3 and 4, left/right lateral direction in FIGS. 5 and 6) of each rotation of the photosensitive drum 21 a first conveyance member 42, a second conveyance member 43 and the developing roller 44, all of which extend parallel to one another.

The developing part 40 feeds toner to the outer circumferential surface of the photosensitive drum 21. The developing part 40 is settable to and removable from the housing 2 of the image forming apparatus 1, as an example. The developing part 40 includes a development container 50, a first conveyance member 42, a second conveyance member 43, a developing roller (developer carrier) 44, and a restricting blade 45.

The development container 50, having a slender shape extending along the axial direction of the photosensitive drum 21, is placed with its longitudinal direction positioned horizontal. That is, the longitudinal direction of the development container 50 is parallel to the axial direction of the photosensitive drum 21. The development container 50 contains, for example, a two-component developer containing toner and magnetic carrier as the toner-containing developer to be fed to the photosensitive drum 21.

The development container 50 includes a partitioning portion 51, a first conveyance chamber 52, a second conveyance chamber 53, a first communicating portion 54, and a second communicating portion 55.

The partitioning portion 51 is provided in lower part inside the development container 50. The partitioning portion 51 is placed at a generally central portion in a direction intersecting the longitudinal direction of the development container 50 (left/right lateral direction in FIG. 4, up/down direction in FIG. 5). The partitioning portion 51 is formed into a generally plate shape extending in the longitudinal direction of the development container 50 as well as in the up/down direction. The partitioning portion 51 partitions interior of the development container 50 in a direction intersecting the longitudinal direction.

The first conveyance chamber 52 and the second conveyance chamber 53 are provided inside the development container 50. The first conveyance chamber 52 and the second conveyance chamber 53 are formed by the interior of the development container 50 being partitioned by the partitioning portion 51. The first conveyance chamber 52 and the second conveyance chamber 53 are juxtaposed generally equal in height to each other.

The second conveyance chamber 53, including a vicinity of a placement area of the developing roller 44 inside the development container 50, is placed in adjacency to the photosensitive drum 21. The first conveyance chamber 52 is placed in a region in the development container 50 isolated from the photosensitive drum 21 more than the second conveyance chamber 53. The first conveyance chamber 52, to which a developer supply pipe (not shown) is connected, is fed with the developer via the developer supply pipe. In the first conveyance chamber 52, the developer is conveyed in a first direction f1 by the first conveyance member 42. In the second conveyance chamber 53, the developer is conveyed by the second conveyance member 43 in a second direction f2 opposite to the first direction f1.

The first communicating portion 54 and the second communicating portion 55 are placed outside both end portions, respectively, of the partitioning portion 51 in its longitudinal direction. The first communicating portion 54 and the second communicating portion 55 allow the first conveyance chamber 52 and the second conveyance chamber 53 to be communicated with each other in a direction intersecting the longitudinal direction of the partitioning portion 51 (left/right lateral direction in FIG. 4, up/down direction in FIG. 5), i.e., in a thicknesswise direction of the generally plate-shaped partitioning portion 51. In other words, the first communicating portion 54 and the second communicating portion 55 allow the first conveyance chamber 52 and the second conveyance chamber 53 to be communicated with each other at their longitudinal-direction both end-side portions.

The first communicating portion 54 allows a first-direction-f1 downstream end of the first conveyance chamber 52 and a second-direction-f2 upstream end of the second conveyance chamber 53 to be communicated with each other. In the first communicating portion 54, the developer is conveyed from the first conveyance chamber 52 side toward the second conveyance chamber 53 side. The second communicating portion 55 allows a second-direction-f2 downstream end of the second conveyance chamber 53 and a first-direction-f1 upstream end of the first conveyance chamber 52 to be communicated with each other. In the second communicating portion 55, the developer is conveyed from the second conveyance chamber 53 side toward the first conveyance chamber 52 side.

The first conveyance member 42 is placed inside the first conveyance chamber 52. The second conveyance member 43 is placed inside the second conveyance chamber 53. The first conveyance member 42 and the second conveyance member 43 are juxtaposed generally equal in height to each other. The second conveyance member 43 extends in proximity and parallel to the developing roller 44. The first conveyance member 42 and the second conveyance member 43 are supported by the development container 50 so as to be rotatable about an axis extending horizontally in parallel to the developing roller 44. The first conveyance member 42 and the second conveyance member 43 are identical in basic configuration to each other. The first conveyance member 42 has helical-shaped first conveyance vanes 42*b* at an outer circumferential portion of a rotating shaft 42*a* extending along the longitudinal direction of the development container 50. The second conveyance member 43 has helical-shaped second conveyance vanes 43*b* at an outer circumferential portion of a rotating shaft 43*a* extending along the longitudinal direction of the development container 50.

Within the first conveyance chamber 52, the first conveyance member 42, while stirring the developer, conveys the developer in the first direction f1 directed from the second communicating portion 55 side toward the first communicating portion 54 side along the rotational axial direction. Within the second conveyance chamber 53, the second conveyance member 43, while stirring the developer, conveys the developer in the second direction f2 from the first communicating portion 54 side toward the second communicating portion 55 side along the rotational axial direction. That is, the first conveyance member 42 and the second conveyance member 43, while stirring, conveys the developer in mutually opposite directions of the longitudinal direction, thus circulating the developer in a specified circulative direction.

The developing roller 44 is positioned above the second conveyance member 43 inside the development container 50 and also placed in opposition to the photosensitive drum 21. The developing roller 44 is supported by the development container 50 so as to be rotatable about an axis extending parallel to the axis of the photosensitive drum 21. The developing roller 44 has a cylindrical-shaped developing sleeve 441 that rotates counterclockwise during image formation, for example as in FIGS. 3 and 4, and a stationary magnet 442 unrotatably fixed within the developing sleeve (see FIG. 4).

The developing roller 44 has its outer circumferential surface partly exposed from the development container 50 and is set into proximate opposition to the photosensitive drum 21. The developing roller 44 carries toner on part of its outer circumferential surface, where the toner is to be fed to the outer circumferential surface of the photosensitive drum 21, in a region opposed to the photosensitive drum 21. The developing roller 44 carries toner within the second conveyance chamber 53 of the development container 50, and feeds the toner to the photosensitive drum 21. In other words, the developing roller 44 makes toner in the second conveyance chamber 53 deposited to an electrostatic latent image on the outer circumferential surface of the photosensitive drum 21, thus forming a toner image.

The restricting blade 45 is placed upstream of an oppositional region between the developing roller 44 and the photosensitive drum 21 as viewed in a rotational direction of the developing roller 44. The restricting blade 45 is placed in proximate opposition to the developing roller 44 with a specified clearance provided between a forward end of the restricting blade 45 and the outer circumferential surface of the developing roller 44. The restricting blade 45 extends over an entire axial length of the developing roller 44. The restricting blade 45 restricts a layer thickness of the developer carried by the outer circumferential surface of the developing roller 44 that passes through the clearance between the forward end of the restricting blade 45 and the outer circumferential surface of the developing roller 44.

Along with rotations of the first conveyance member 42 and the second conveyance member 43, developer in the development container 50 circulates in a specified circulating direction between the first conveyance chamber 52 and the second conveyance chamber 53 via the first communicating portion 54 and the second communicating portion 55. In this case, the toner in the development container 50 is stirred and electrically charged so as to be carried on the outer circumferential surface of the developing roller 44. The developer carried on the outer circumferential surface of the developing roller 44, after restricted in its layer thickness by the restricting blade 45, is conveyed to the oppositional region between the developing roller 44 and the photosensitive drum 21 by the rotation of the developing roller 44. When a specified developing voltage is applied to the developing roller 44, toner in the developer (or in the magnetic brush) carried on the outer circumferential surface of the developing roller 44 is moved to the outer circumferential surface of the photosensitive drum 21 in the oppositional region due to a potential difference from a potential of the surface (outer circumferential surface) of the photosensitive drum 21. As a result of this, the electrostatic latent image on the outer circumferential surface of the photosensitive drum 21 is developed by the toner.

The development container 50 further includes a discharge part 56. The discharge part 56 is provided downstream of the second-direction-f2 downstream end of the second conveyance chamber 53. The discharge part 56 connects with the second conveyance chamber 53. The discharge part 56 and the second conveyance chamber 53 are internally communicated with each other. The discharge part 56 is smaller in inner diameter than the second conveyance chamber 53. The discharge part 56 has a developer discharge port 561.

In addition, the rotating shaft 43*a* of the second conveyance member 43 extends continuously to within the discharge part 56. One axial end of the rotating shaft 43*a* is rotatably supported by the development container 50 at a downstream end of the discharge part 56 as viewed in the second direction f2 of the second conveyance chamber 53.

The developer discharge port 561 is placed at a downstream end of the discharge part 56 as viewed in the second direction f2 of the second conveyance chamber 53. For example, the developer discharge port 561 is opened under the rotating shaft 43*a* of the second conveyance member 43. The developer discharge port 561 allows excess developer within the development container 50 to be discharged outside.

The second conveyance member 43 further includes restricting vanes 43*c* and discharge vanes 43*d* in addition to the second conveyance vanes 43*b*. These three kinds of vanes are provided in an order of the second conveyance vanes 43*b*, the restricting vanes 43*c* and the discharge vanes 43*d* as mentioned from the second conveyance chamber 53 side toward the discharge part 56. The restricting vanes 43*c* and the discharge vanes 43*d* are provided integrally with the rotating shaft 43*a*, like the second conveyance vanes 43*b*, so as to extend helically along the axial direction of the rotating shaft 43*a* in its outer circumferential portion.

The restricting vanes 43*c* are positioned downstream of the second conveyance vanes 43*b* as viewed in the second direction f2 of the second conveyance chamber 53, and placed within the second conveyance chamber 53. The restricting vanes 43*c* are opposed to a connecting portion between the second conveyance chamber 53 and the discharge part 56 in the axial direction of the rotating shaft 43*a*.

The restricting vanes 43*c* are inverse to the second conveyance vanes 43*b* in terms of winding direction. As a result of this, the restricting vanes 43*c* block the developer that has been conveyed to near the downstream end within the second conveyance chamber 53, so that movement of the developer to the discharge part 56 side is restricted. It is noted that the restricting vanes 43*c* are smaller in pitch than the second conveyance vanes 43*b*.

An outer circumferential portion of the restricting vanes 43*c* has a specified clearance against an inner surface of the development container 50. Developer having exceeded a specified quantity in the second conveyance chamber 53 is conveyed, as excess developer, through the clearance between the outer circumferential portion of the restricting vanes 43*c* and the inner surface of the development container 50 toward the discharge part 56.

The discharge vanes 43*d* are positioned downstream of the restricting vanes 43*c* as viewed in the second direction f2 of the second conveyance chamber 53, and placed within the discharge part 56. The discharge vanes 43*d* are identical in winding direction to the second conveyance vanes 43*b*. That is, the developer conveyance direction in the discharge part 56 is identical to the second direction f2 of the second conveyance chamber 53. As a result of this, the discharge vanes 43*d* convey excess developer in the discharge part 56 toward the developer discharge port 561. It is noted that an outer diameter of the discharge vanes 43*d* is smaller than outer diameters of the second conveyance vanes 43*b* and the restricting vanes 43*c*. A pitch of the discharge vanes 43*d* is smaller than a pitch of the second conveyance vanes 43*b*.

Next, a further detailed configuration of the developing part 40 will be described below with reference to FIGS. 4, 5 and 6. It is noted that arrows representing an airflow direction fd in a duct 61 are added in FIGS. 4 and 6.

The developing part 40 includes a toner trapping mechanism 60. The toner trapping mechanism 60 traps toner present in the second conveyance chamber 53. The toner trapping mechanism 60 includes the duct 61, a filter 62, and a fan 63.

The duct 61 is placed in adjacency to the second conveyance chamber 53. The duct 61 is opposed to the photosensitive drum 21 with a placement area of the developing roller 44 in the development container 50 interposed therebetween as viewed in a direction intersecting the longitudinal direction of the development container 50 (left/right lateral direction in FIG. 4, drawing-sheet depthwise direction in FIG. 6). The duct 61 is connected to the second conveyance chamber 53 at an upstream end in the airflow direction. The duct 61 allows air within the second conveyance chamber 53 to be circulated therethrough. The duct 61 has an air inlet port 611 and an air exhaust port 612.

The air inlet port 611, which is a connecting portion of the duct 61 with the second conveyance chamber 53, is placed above the developing roller 44. The air inlet port 611 is positioned at an upstream end of the duct 61 in the airflow direction. The air inlet port 611 is opened over an entire longitudinal length of the second conveyance chamber 53. The air inlet port 611 is formed into, for example, a rectangular shape elongated in the longitudinal direction of the second conveyance chamber 53, and opposed to the developing roller 44. The air inlet port 611 allows interior of the second conveyance chamber 53 and interior of the duct 61 to be communicated with each other. Air in the second conveyance chamber 53 is permitted to flow into the duct 61 through the air inlet port 611.

The air exhaust port 612 is placed, for example, at a back portion of the development container 50. The air exhaust port 612 is placed at a downstream end of the duct 61 in its airflow direction. The air exhaust port 612 permits air present in the duct 61 to flow out. That is, air in the second conveyance chamber 53 is permitted to flow out from within the duct 61 through the air exhaust port 612.

The filter 62 is placed in the duct 61. The filter 62 covers an airflow cross-section of the duct 61. That is, air in the second conveyance chamber 53 that has flowed into the duct 61 through the air inlet port 611 is permitted to pass through the filter 62. As a result of this, the filter 62 traps toner contained in airflows passing through the duct 61.

The fan 63 is connected to the air exhaust port 612 of the duct 61. As the fan 63 is driven (rotated forward), air in the second conveyance chamber 53 is forcedly sucked into the duct 61 and then let to flow outside through the air exhaust port 612. In other words, the fan 63 forcedly sucks air in the second conveyance chamber 53 into the duct 61, letting the air flow outside.

As shown in FIG. 6, an exhaust side of the fan 63 under its forward rotation is connected to a housing duct 2*a* provided in the housing 2 of the image forming apparatus 1. The housing duct 2*a* extends up to an air exhaust part (not shown) provided in exterior of the image forming apparatus 1 and communicated with outside of the image forming apparatus 1. As a result of this, the fan 63 allows the air in the second conveyance chamber 53 to flow outside of the image forming apparatus 1 via the duct 61 and the housing duct 2*a*. Otherwise, the fan 63 may be placed in the exhaust part to which the housing duct 2*a* is connected so that the exhaust part is communicated with outside of the image forming apparatus 1.

Then, the air exhaust port 612 of the duct 61 is placed downstream of the air inlet port 611 as viewed in a developer conveyance direction (second direction f2) of the second conveyance chamber 53. That is, referring to FIG. 6, the air exhaust port 612 is placed on a downstream side, i.e. left side, of the air inlet port 611 as viewed in the second direction f2 in which the developer is conveyed from right toward left.

As shown in FIGS. 2 and 6, the image forming apparatus 1 further includes a vibration generating part 14. The vibration generating part 14 is set on the housing 2 of the image forming apparatus 1.

The vibration generating part 14 includes, for example, a vibrating motor, a control board, as well as other electronic circuits and electronic components (none shown). On an output shaft of the vibrating motor, attached is an exciting weight whose center of gravity is eccentric to a rotational axis of the output shaft of the vibrating motor.

The vibration generating part 14 is connected to the retaining member 64 via a connecting member 14*a*. As the vibrating motor is driven, the vibration generating part 14 makes the filter 62 vibrated via the retaining member 64. In other words, vibrations are imparted to the filter 62 by the vibration generating part 14. By the first filter 621 being vibrated by the vibration generating part 14, toner trapped by the first filter 621 and deposited on the first filter 621 can be dropped into the second conveyance chamber 53. Therefore, functions of the first filter 621 can be recovered, making it possible to continuously suppress toner scattering in the image forming apparatus 1. It is to be noted that toner dropped from the first filter 621 due to vibrations would be deposited on the magnetic brush formed on the outer circumferential surface of the developing roller 44.

The vibration generating part 14 is placed in opposition to the development container 50 outside the developing part 40. Then, the vibration generating part 14 is placed downstream of the second conveyance chamber 53 as viewed in a developer conveyance direction (second direction f2). That is, referring to FIG. 6, the vibration generating part 14 is placed on a downstream side, i.e. left side, of the second conveyance chamber 53 as viewed in the second direction f2 in which the developer is conveyed from right toward left.

In the image forming apparatus 1, the quantity of scattered toner comes to the smallest one at a downstream portion in the developer conveyance direction (second direction f2) of the second conveyance chamber 53, i.e., on a left end side of the second conveyance chamber 53 in FIGS. 5 and 6. Therefore, in this embodiment, the vibration generating part 14 is placed, with a clearance provided against the development container 50, in proximity to the region having the smallest quantity of scattered toner in the developer conveyance direction of the second conveyance chamber 53. As a result of this, the vibration generating part 14 of large size and high output can be provided in the image forming apparatus 1. Thus, it becomes implementable to effectively recover the toner-trapping function of the filter 62 while suppressing increases in toner scattering.

Now, evaluation of toner scattering in the image forming apparatus 1 will be described below. In this evaluation, printing with images at a print coverage rate of 5% per sheet S was carried out in a total of 5,000 sheets on a basis of 1,000 sheets for each of one-sheet intermittence (one-second halt after every one-sheet printing), five-sheet intermittence (one-second halt after every five-sheet printing; ditto for the followings), ten-sheet intermittence, twenty-sheet intermittence, and continuous printing. Each time 5,000 sheets were printed, the toner collection mode was executed. Then, printing in the same manner was carried out up to 100,000 sheets, and toner scattering onto the top surface of the development container 50 was checked.

In execution of intermittent printing, there is a need for driving the developing part 40 during a certain stabilization period (e.g., 5 sec) before and after printing in order to obtain system stabilization. In cases of smaller-number-of-sheets intermittent printing such as one-sheet intermittence and five-sheet intermittence, when an identical number of sheets (e.g., 1,000 sheets) are printed, the number of times of the stabilization period increases (1,000 times for one-sheet intermittence, 200 times for five-sheet intermittence), hence a fear for generation of larger quantities of toner scattering. For this reason, system speed is set lower than normal in smaller-number-of-sheets intermittent printing. Since toner scattering decreases more and more with lowering system speed, generation of toner scattering can be suppressed in smaller-number-of-sheets intermittent printing such as one-sheet intermittence and five-sheet intermittence. In particular, in the case of one-sheet intermittence, further lowering the system speed than in the case of five-sheet intermittence allows the generation of toner scattering to be suppressed to more extent.

TABLE 1

| | PLACEMENT OF VIBRATION GENERATING PART | DEGRADATION RATE OF FILTER PERFORMANCE | TONER SCATTERING |
|---|---|---|---|
| EXAMPLE 1 | HOUSING: DOWNSTREAM SIDE OF SECOND CONVEYANCE CHAMBER | LOW | SLIGHT |
| COMPARATIVE EXAMPLE 1 | HOUSING: UPSTREAM SIDE OF SECOND CONVEYANCE CHAMBER | LOW | LARGE-QUANTITY |
| COMPARATIVE EXAMPLE 2 | DEVELOPING PART: UPSTREAM SIDE OF SECOND CONVEYANCE CHAMBER | HIGH | VERY LARGE-QUANTITY |
| COMPARATIVE EXAMPLE 3 | DEVELOPING PART: DOWNSTREAM SIDE OF SECOND CONVEYANCE CHAMBER | HIGH | LARGE-QUANTITY |

Evaluation conditions and evaluation results are shown in Table 1. In Example 1 and Comparative Example 1 both in which the vibration generating part is provided on the image forming apparatus housing, a high-power vibrating motor (Cylinder Type Vibration Motor SD-0820CY (cylinder dia. 8 mm, cylinder length 20 mm) made by Shinano Electronics Co., Ltd.) was used. In Comparative Examples 2 and 3 in which the vibration generating part was provided in the developing part, a vibrating motor lower in power than Example 1 and Comparative Example 1 (Cylinder Type Vibration Motor SD-0408CY (cylinder dia. 4 mm, cylinder length 8 mm) made by Shinano Electronics Co., Ltd.) was used. As a result, Example 1 and Comparative Example 1 are lower in degradation rate of filter performance, and Comparative Examples 2 and 3 are higher in degradation rate of filter performance.

Then, in the image forming apparatuses of Example 1 and Comparative Example 3, the vibration generating part is placed on the downstream side in the developer conveyance direction of the second conveyance chamber. On the other hand, in the image forming apparatuses of Comparative Examples 1 and 2, the vibration generating part is placed on the upstream side in the developer conveyance direction of the second conveyance chamber.

According to Table 1, it can be understood that in the image forming apparatuses of Comparative Examples 2 and 3, a very large-quantity, or large-quantity, of toner scattering was found. In Comparative Examples 2 and 3, it can be considered that placement of the vibration generating part provided on the developing part causes distances between toner scattering regions and vibration generating part to be so close that scattered toner is more likely to be deposited on the vibration generating part, the toner being further diffused by vibrations of the vibration generating part.

In the image forming apparatus of Comparative Example 1, it can be understood that a large-quantity of toner scattering was found. In Comparative Example 1, although placement of the vibration generating part provided on the image forming apparatus housing involves far distances from toner scattering regions to the vibration generating part, the placement of the vibration generating part on the upstream side of the second conveyance chamber makes toner scattering more likely to occur.

By contrast, the image forming apparatus 1 in Example 1 of this disclosure is found slight in terms of toner scattering. In Example 1, the vibration generating part 14 is provided on the housing 2 of the image forming apparatus 1 and moreover placed on the downstream side of the second conveyance chamber 53 where the quantity of scattered toner comes to the least, making it reasonable that a slight quantity of toner scattering results. Thus, according to the configuration of the Example, it becomes implementable to effectively recover the toner-trapping function of the filter 62 while suppressing increases in toner scattering.

Further, with a view to reducing toner scattering, control method for the vibration generating part was changed, followed by evaluation. Printing and other conditions in this evaluation were generally the same as those of the foregoing evaluation, but vibration timing and voltage control method for the vibration generating part were changed. Vibrations were executed for each 1,000 sheets of printing.

TABLE 2

| | PLACEMENT OF VIBRATION GENERATING PART | VOLTAGE CONTROL FOR VIBRATION GENERATING PART | TONER SCATTERING |
|---|---|---|---|
| EXAMPLE 2 | HOUSING: DOWNSTREAM SIDE OF SECOND CONVEYANCE CHAMBER | BOOST STEPWISE | NO |
| COMPARATIVE EXAMPLE 4 | HOUSING: DOWNSTREAM SIDE OF SECOND CONVEYANCE CHAMBER | OFF → ON | SLIGHT |

Evaluation conditions and evaluation results are shown in Table 2. In both Example 2 and Comparative Example 4, the vibration generating part is provided on the image forming apparatus housing and moreover placed on a downstream side in the developer conveyance direction of the second conveyance chamber.

Then, in the image forming apparatus 1 of Example 2, the controller 8 boosts stepwise drive power for the vibration generating part 14 in an initial stage (e.g., initial two seconds out of five-second vibration-impartment period) of vibration start for the filter 62 by the vibration generating part 14. On the other hand, in the image forming apparatus of Comparative Example 4, drive power for the vibration generating part 14 is boosted instantaneously from off to on at a moment when vibrations for the filter by the vibration generating part are started.

According to Table 2, in the image forming apparatus of Comparative Example 4, it can be understood that a slight quantity of toner scattering was found. On the other hand, in the image forming apparatus 1 of Example 2 of this disclosure, it can be understood that no toner scattering was found. Thus, according to the configurations of the Examples, it becomes implementable to even more effectively suppress toner scattering in the image forming apparatus 1.

Alternatively, in the initial stage of vibration start for the filter 62 by the vibration generating part 14, drive power for the vibration generating part 14 may be boosted continuously.

Also, the filter 62 includes a first filter 621 and a second filter 622. As shown in FIG. 4, the first filter 621 and the second filter 622 are both retained by a single retaining member 64. The retaining member 64 is placed at an airflow-direction upstream portion in the duct 61 so as to be adjacent to the air inlet port 611.

The first filter 621 is placed at a site of the air inlet port 611, which is a connecting portion between the duct 61 and the second conveyance chamber 53. The first filter 621, identical in shape to the air inlet port 611, is formed into, for example, a rectangular shape elongated in the longitudinal direction of the second conveyance chamber 53. The first filter 621 covers the air inlet port 611. That is, the first filter 621 is opposed to the developing roller 44. The first filter 621 traps toner contained in air that flows from the second conveyance chamber 53 into the duct 61.

The second filter 622 is placed on a downstream side of the first filter 621 as viewed in the airflow direction in the duct 61. The second filter 622, which is identical in shape to a cross section in a direction intersecting the airflow direction in the duct 61, is formed into, for example, a rectangular shape elongated in the longitudinal direction of the second conveyance chamber 53. The second filter 622 covers the airflow cross-section in the duct 61. The second filter 622 traps toner contained in the air passing through the first filter 621 and flowing within the duct 61.

The first filter 621 is a nonwoven fabric which is made from, for example, circular-in-cross-section fabric having an outer diameter of 10 to 20 μm and which has a thickness of about 1 mm. The second filter 622 is a nonwoven fabric which is made from, for example, circular-in-cross-section fabric having an outer diameter of 20 to 40 μm and which has a thickness of about 0.2 mm. The second filter 622 is enhanced in toner trapping efficiency by virtue of its being made finer in mesh roughness than the first filter 621.

According to the makeup of the filter 62, the first filter 621 can be kept from large-quantity trapping of scattered toner present in the second conveyance chamber 53 (around the developing roller 44), thus being made less likely to be clogged. Further, the second filter 622 makes it possible to prevent leakage of toner outside of the development container 50. Furthermore, setting the first filter 621 larger in opening area than the second filter 622 makes it implementable to uniformize sucking force by the fan 63 at the site of the first filter 621.

In the stationary magnet 442, a plurality of magnetic poles are arrayed along the circumferential direction of the developing sleeve 441. The stationary magnet 442 has a magnetic pole **442*a* as one of the plurality of magnetic poles (see FIG. 4). In FIG. 4, a rotational direction R21 (forward rotation) of the developing roller 44 (developing sleeve 441**) during image formation is shown by an arrow.

The magnetic pole **442*a* is placed in a region opposed to the first filter 621 as viewed in the rotational direction R21 of the developing sleeve 441 during image formation. In other words, the magnetic pole 442*a* is placed downstream of the oppositional region between the developing sleeve 441 and the photosensitive drum 21 as viewed in the rotational direction R21 of the developing sleeve 441 during image formation. The developer, while carried by an outer circumferential surface of the developing sleeve 441 with magnetic force of the magnetic pole 442*a*, is conveyed along with rotation of the developing sleeve 441** in its rotational direction.

As to magnetic force on the outer circumferential surface of the developing roller 44, there are regions where vertical magnetic force becomes 0 mT (sites indicated by two-dot chain line in FIG. 4) on upstream side and downstream side, respectively, of the magnetic pole **442*a* as viewed in the rotational direction R21. These positions with vertical magnetic force being 0 mT, when extended radially outward of the developing roller 44, lead to an upstream-side edge portion and a downstream-side edge portion of the first filter 621. That is, the magnetic pole 442***a* is placed in opposition to the first filter 621.

According to the placement and configuration of the first filter 621 and the magnetic pole 442*a*, toner dropped from the first filter 621 can be more easily collected by the magnetic brush on the outer circumferential surface of the developing roller 44. In particular, as viewed in the rotational direction R21, a region up to about an intermediate point between a peak position of vertical magnetic force of the magnetic pole 442*a* and a position of the vertical magnetic force of 0 mT is where toner can be more easily collected with the magnetic brush erected. Therefore, it is preferable that this region is opposed to the first filter 621.

Developer to be used for formation of toner images in the image forming apparatus 1 is a two-component developer containing magnetic carrier and toner. With a two-component developer, it is known that toner scattering from the development container 50 is more likely to occur. Therefore, in the image forming apparatus 1 with the use of a two-component developer, properly placing the vibration generating part 14 as described above makes it possible to even more effectively suppress toner scattering in the image forming apparatus 1.

In connection with toner trapped by the filter 62, the controller 8 of the image forming apparatus 1 is enabled to execute two control modes, toner collection mode and toner discharge mode.

In the toner collection mode, toner trapped by the filter 62 is deposited on the developing roller 44 and collected as such. In more detail, in the toner collection mode, the first filter 621 is vibrated by the vibration generating part 14 so that toner trapped by the first filter 621 and deposited on the first filter 621 is dropped onto the magnetic brush formed on the outer circumferential surface of the developing roller 44 and thus collected. A detailed process of the toner collection mode will be described later.

In the toner discharge mode, by the fan 63 being rotated reverse, toner trapped by the filter 62 is discharged from within the duct 61 to the second conveyance chamber 53 side. In more detail, in the toner discharge mode, the fan 63 is rotated reverse relative to its forward rotation by which air within the second conveyance chamber 53 is sucked into the duct 61. As a result of this, the toner trapped by the second filter 622 and deposited on the second filter 622 is discharged from within the duct 61 to the second conveyance chamber 53 side. A detailed process of the toner discharge mode will be described later.

With the above-described configuration, it becomes possible to more effectively recover the functions of the first filter 621 and the second filter 622, which are placed at an upstream portion in the airflow direction of the duct 61 and a downstream-side portion of the upstream portion, respectively.

Figure 7:
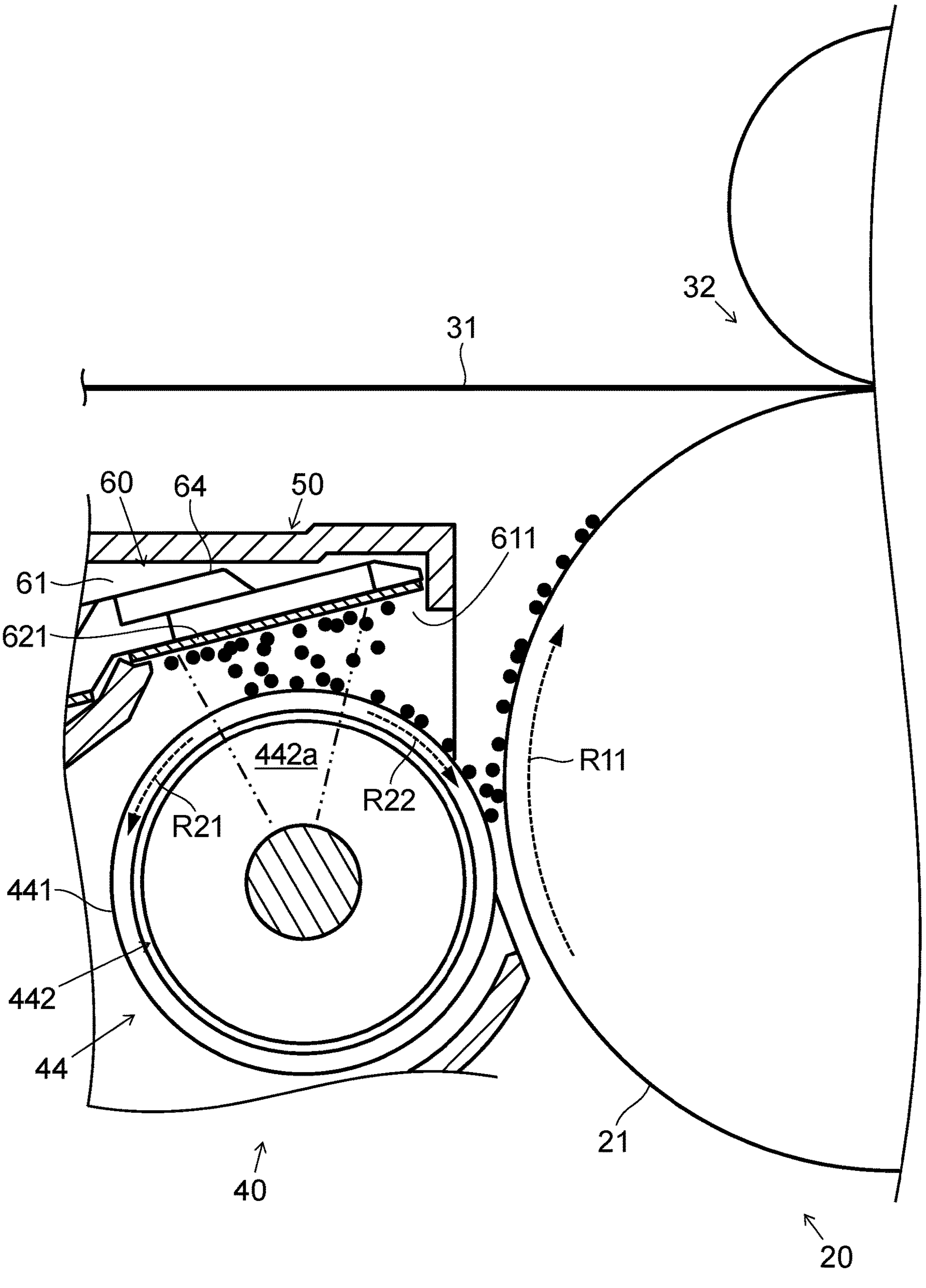
FIG. 7 is a partly enlarged cross-sectional front view of around the image forming part of FIG. 3 as well as an explanatory view of control modes related to suppression of toner scattering.

Furthermore, for each of the toner collection mode and the toner discharge mode, the controller 8 is enabled to execute two modes, toner-discard-type control mode in which toner trapped by the filter 62 is discarded and toner-reuse-type control mode in which the toner is reused. FIG. 7 is a partly enlarged cross-sectional front view of around the image forming part 20 of FIG. 3 as well as an explanatory view of control modes related to suppression of toner scattering.

Arrows drawn in FIG. 7 show a rotational direction R11 of the photosensitive drum 21 during image formation, a rotational direction R21 (forward rotation) of the developing roller 44 (developing sleeve 441) during image formation, and a rotational direction R22 (reverse rotation) of the developing roller 44 (developing sleeve 441) in the toner-discard-type control mode. The rotational direction R21 and the rotational direction R22 of the developing roller 44 are opposite in direction to each other. Also in FIG. 7, for explanation's sake, toner (of filled-circle shape) dropped from the first filter 621 is drawn on the outer circumferential surface of the developing roller 44 under the first filter 621 as well as on the outer circumferential surface of the photosensitive drum 21. However, actual toner is far smaller than the toner (of filled-circle shape) drawn in FIG. 7. Besides, although the magnetic brush of the developer is formed on the outer circumferential surface of the developing roller 44, drawing of the magnetic brush is omitted.

In the toner-discard-type control mode, the controller 8 makes the filter 62 vibrated by the vibration generating part 14 during non-image formation. Further, the controller 8 controls the charging part 22 and the voltage application part 12 so as to generate a potential difference in a direction that causes toner to be moved from the developing roller 44 to the photosensitive drum 21. Along with this, the controller 8 also makes the developing roller 44 rotated in a direction (R22 direction of FIG. 7) reverse to that of image formation, and moreover makes the photosensitive drum 21 rotated in the same direction (R11 direction of FIG. 7) as that of image formation. Then, by the toner-discard-type control mode, the controller 8 delivers scattered toner dropped or discharged from the toner trapping mechanism 60 and deposited on the magnetic brush in the outer circumferential surface of the developing roller 44 via the photosensitive drum 21 to the drum cleaning part 23, thus discarding the toner.

In the toner-discard-type control mode, it is desirable that, without applying a transfer bias in the primary transfer part 32, toner deposited on the outer circumferential surface of the photosensitive drum 21 is kept from moving from the photosensitive drum 21 to the intermediate transfer belt 31. As a result of this, in-apparatus contamination with toner, which would cause unstable electric chargeability, can be prevented.

With the above-described configuration, unreusable toner out of scattered toner trapped by the filter 62 can be discarded by using the developing roller 44, the photosensitive drum 21 and the drum cleaning part 23. As a result of this, toner scattering in the image forming apparatus 1 can be suppressed, and moreover unreusable toner is returned into the second conveyance chamber 53 and utilized for image formation, contributing to suppression of degradation in image quality.

In the toner-reuse-type control mode, the controller 8 makes the filter 62 vibrated by the vibration generating part 14 during non-image formation. Further, the controller 8 makes the developing roller 44 rotated in the same direction (R21 direction in FIG. 7) as that during image formation. Then, by the toner-reuse-type control mode, the controller 8 returns, to within the second conveyance chamber 53 for reuse therein, scattered toner dropped or discharged from the toner trapping mechanism 60 and deposited on the magnetic brush in the outer circumferential surface of the developing roller 44.

With the above-described configuration, reusable toner out of scattered toner trapped by the filter 62 can be returned, and reused, to within the second conveyance chamber 53 by using the developing roller 44. As a result of this, toner scattering in the image forming apparatus 1 can be suppressed, and moreover it becomes implementable to fulfill high-efficiency image formation with reusable toner returned to within the second conveyance chamber 53.

Figure 8:
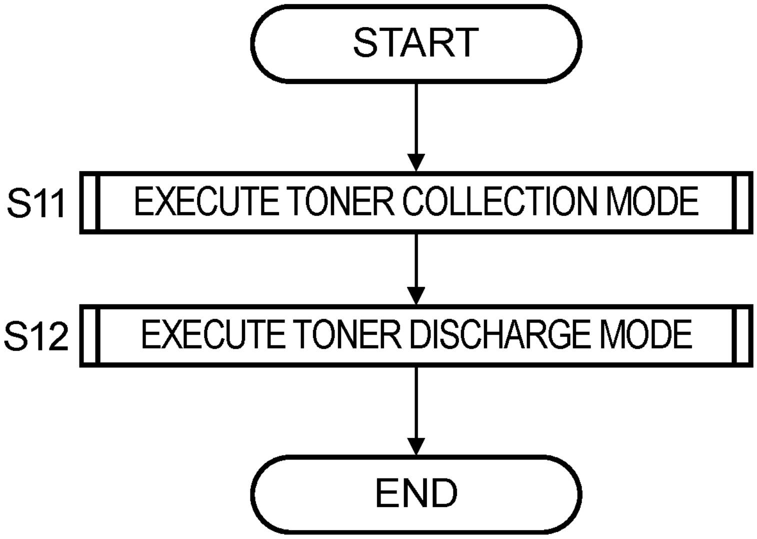
FIG. 8 is a flowchart showing a suppression process for toner scattering from the developing part of FIG. 3.

Next, examples of a suppression process for toner scattering from the developing part 40 will be described. FIG. 8 is a flowchart showing a suppression process for toner scattering from the developing part 40 of FIG. 3.

In the image forming apparatus 1, a suppression process for toner scattering from the developing part 40 is executed after each time a specified number of printed sheets is reached. That is, when the specified number of printed sheets has been reached ('START' in FIG. 8), the controller 8 executes the toner collection mode (step S11). A detailed process of the toner collection mode will be described later.

Next, the controller 8 executes the toner discharge mode (step S12). A detailed process of the toner discharge mode will be described later. Then, the controller 8 ends the process related to FIG. 8.

As described above, the controller 8 executes the toner collection mode and the toner discharge mode in an order of firstly toner collection mode and then toner discharge mode. According to this configuration, in association with toner trapped by the filter 62, toner trapped by the first filter 621 is first collected in the toner collection mode, and further toner trapped by the second filter 622 is discharged from within the duct 61 in the toner discharge mode. In a case where the toner discharge mode is executed earlier than the toner collection mode, a large quantity of toner at a time would drop from the first filter 621 onto the developing roller 44, causing a fear that a large quantity of toner scattering may occur on the top surface of the development container 50. Further, toner trapped by the second filter 622, while being blocked from passing through the first filter 621, may be deposited and remain on the first filter 621. Executing the two modes stepwise as described above makes it possible to recover the functions of the filter 62 efficiently, so that toner scattering in the image forming apparatus 1 can be suppressed continuously.

In addition, it is not necessarily the case that the toner discharge mode is executed in succession to the toner collection mode; it is permitted to end only with the toner collection mode. Also, the above-described suppression process for toner scattering is executed at an end of a print job or between print jobs.

Figure 9:
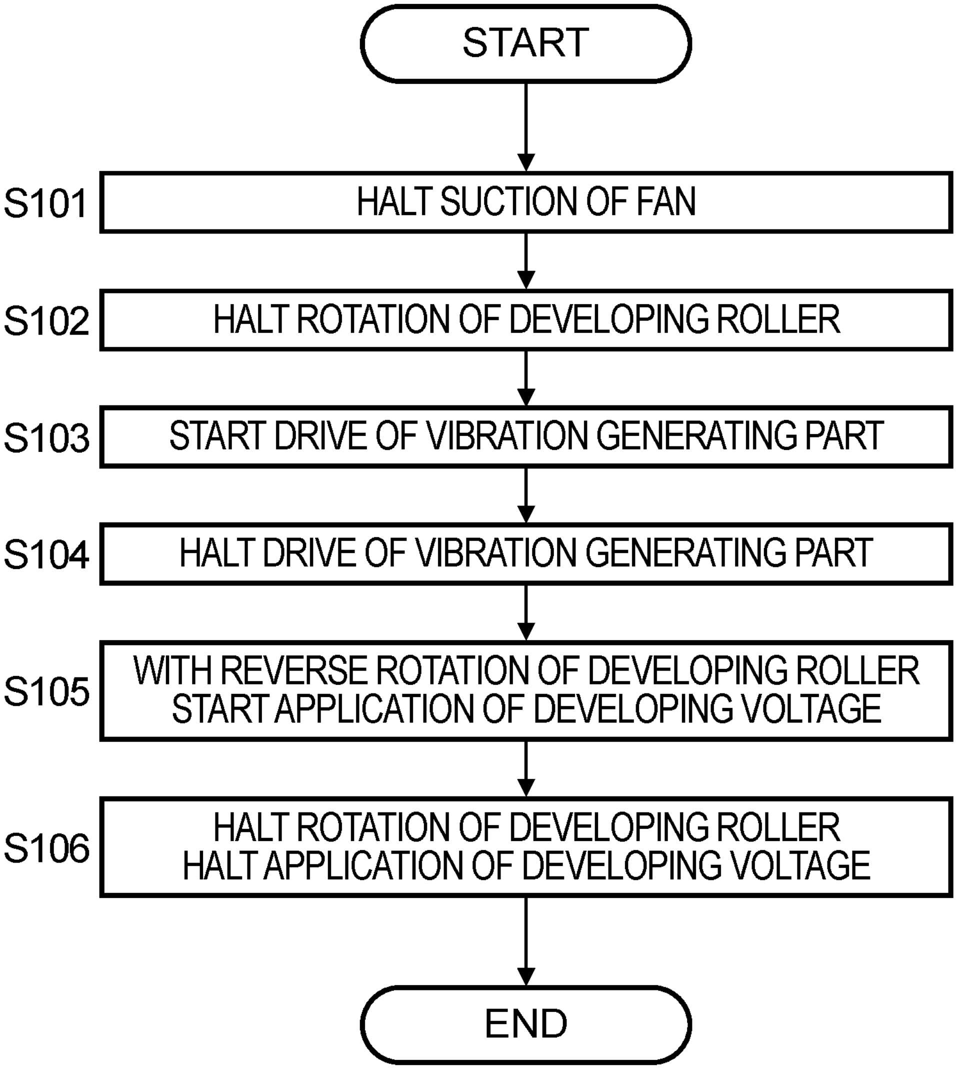
FIG. 9 is a flowchart showing a process of toner-discard-type toner collection mode related to the developing part of FIG. 3.

FIG. 9 is a flowchart showing a process of toner-discard-type toner collection mode related to the developing part 40 of FIG. 3. When the toner-discard-type toner collection mode is started, the controller 8 halts suction of air present in the second conveyance chamber 53 into the duct 61 by the fan 63 (step S101). Next, the controller 8 halts rotation of the developing roller 44 (step S102).

Next, the controller 8 starts drive of the vibration generating part 14 (step S103). The vibration generating part 14 is driven for a specified period (e.g., 5 sec). Then, the controller 8 halts the drive of the vibration generating part 14 (step S104).

Next, the controller 8 makes the developing roller 44 rotated reverse, starting application of a developing voltage by the voltage application part 12 (step S105). The reverse rotation of the developing roller 44 is executed for a specified period (e.g., one-round time duration by the developing roller 44). Then, the controller 8 halts the rotation of the developing roller 44, halts the application of the developing voltage by the voltage application part 12 (step S106), ending the process related to FIG. 9.

Figure 10:
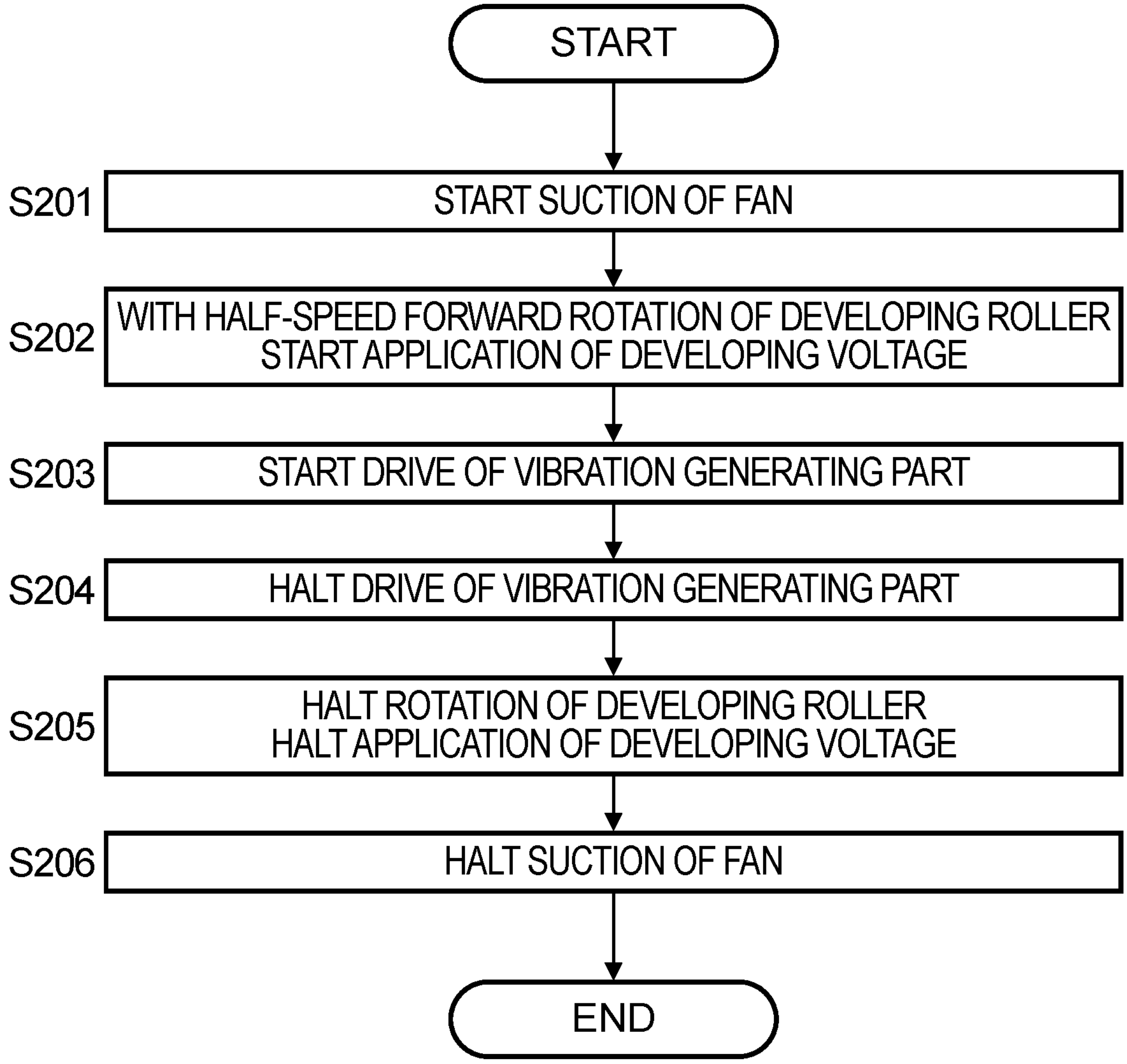
FIG. 10 is a flowchart showing a process of toner-reuse-type toner collection mode related to the developing part of FIG. 3.

FIG. 10 is a flowchart showing a process of toner-reuse-type toner collection mode related to the developing part 40 of FIG. 3. When the toner-reuse-type toner collection mode is started, the controller 8 starts suction of air present in the second conveyance chamber 53 into the duct 61 by the fan 63 (step S201). In this case, in order to enhance vibration effect, the controller 8 makes the fan 63 rotated at a speed lower than that during image formation.

Next, the controller 8 makes the developing roller 44 rotated forward at a half speed (half of normal speed), starting the application of the developing voltage by the voltage application part 12 (step S202). It is noted that the rotational speed of the developing roller 44 is not limited to half speed and needs only to be equal to or lower than that during image formation.

Next, the controller 8 starts drive of the vibration generating part 14 (step S203). The vibration generating part 14 is driven for a specified period (e.g., 5 sec). Then, the controller 8 halts the drive of the vibration generating part 14 (step S204).

Next, the controller 8 halts the rotation of the developing roller 44, halting the application of the developing voltage by the voltage application part 12 (step S205). In this case, the controller 8 halts the rotation of the developing roller 44 simultaneously with a halt of vibrations of the filter 62 by the vibration generating part 14 or a specified time elapse after a halt of the vibrations of the filter 62.

Then, the controller 8 halts the suction of air present in the second conveyance chamber 53 into the duct 61 by the fan 63 (step S206), ending the process related to FIG. 10.

Figure 11:
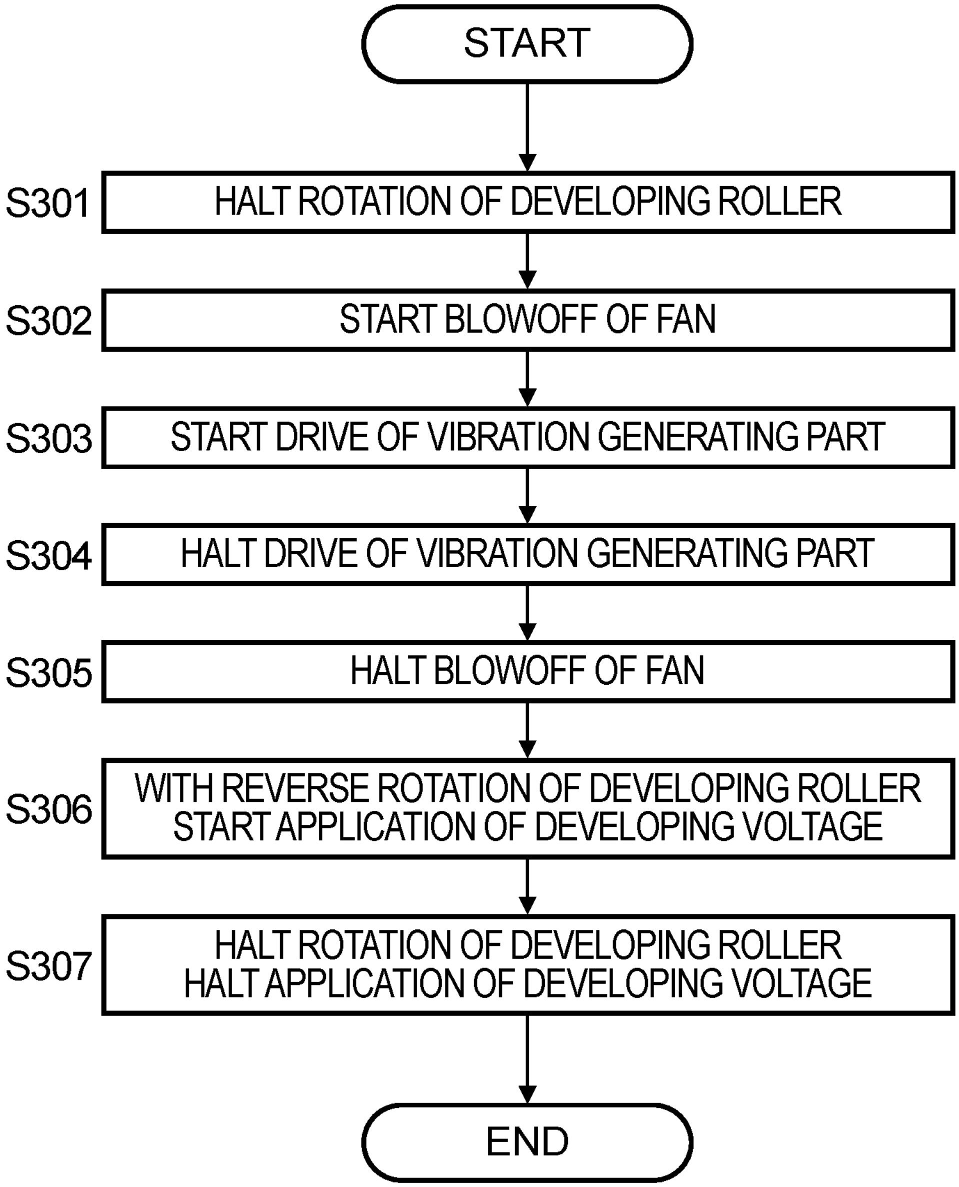
FIG. 11 is a flowchart showing a process of toner-discard-type toner discharge mode related to the developing part of FIG. 3.

FIG. 11 is a flowchart showing a process of toner-discard-type toner discharge mode related to the developing part 40 of FIG. 3. When the toner-discard-type toner discharge mode is started, the controller 8 halts the rotation of the developing roller 44 (step S301). Next, the controller 8 starts blowoff of air present in the duct 61 into the second conveyance chamber 53 by the fan 63 (step S302). In this case, the controller 8 makes the fan 63 rotated reverse at a speed equal or lower than that of forward rotation by which air present in the second conveyance chamber 53 is sucked into the duct 61.

Next, the controller 8 starts drive of the vibration generating part 14 (step S303). The vibration generating part 14 is driven for a specified period (e.g., 5 sec). Then, the controller 8 halts the drive of the vibration generating part 14 (step S304).

Next, the controller 8 halts the blowoff of the air present in the duct 61 into the second conveyance chamber 53 by the fan 63 (step S305).

Next, the controller 8 makes the developing roller 44 rotated reverse, starting application of the developing voltage by the voltage application part 12 (step S306). The reverse rotation of the developing roller 44 is executed for a specified period (e.g., one-round time duration by the developing roller 44). Then, the controller 8 halts the rotation of the developing roller 44 and halts the application of the developing voltage by the voltage application part 12 (step S307), ending the process related to FIG. 11.

Figure 12:
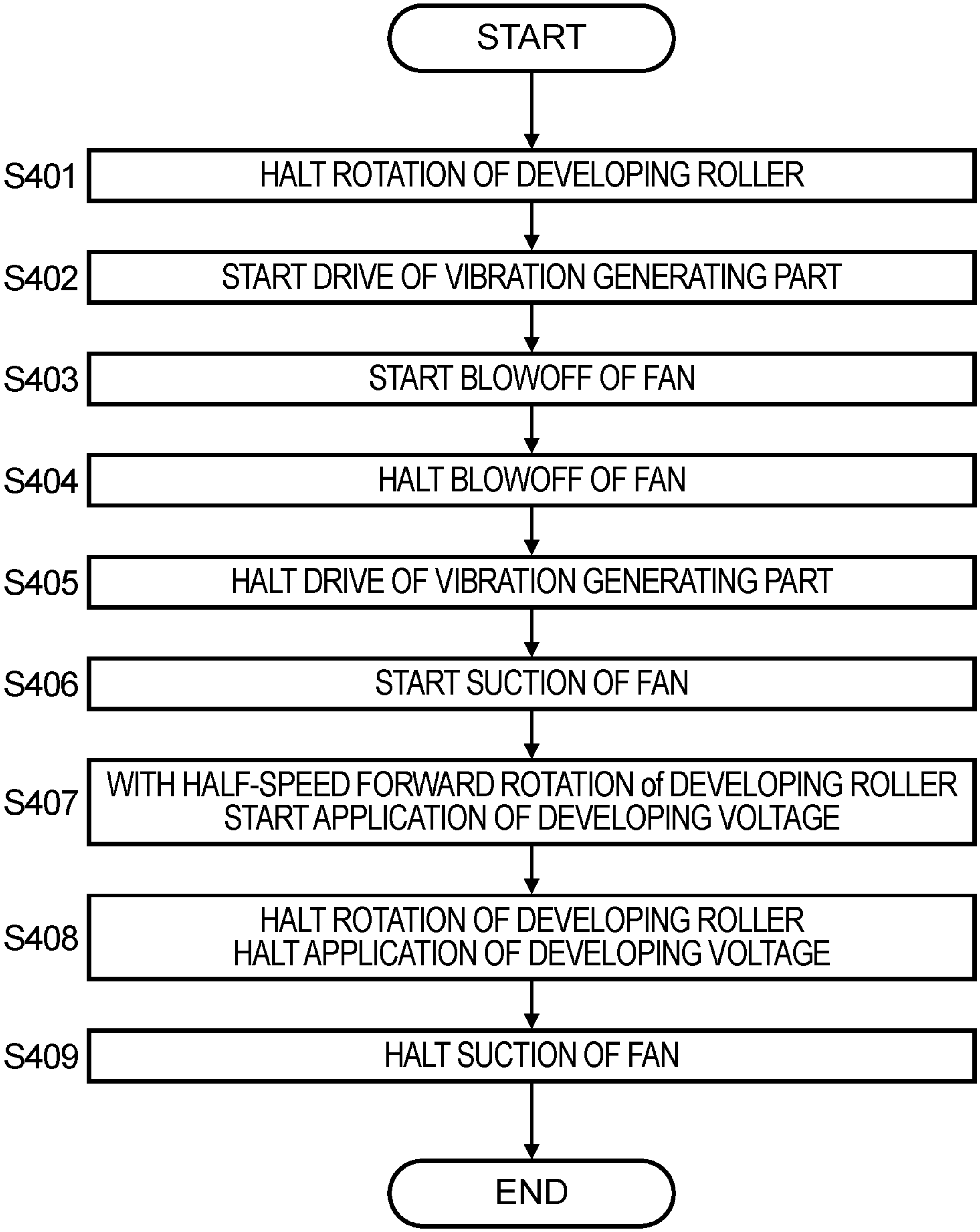
FIG. 12 is a flowchart showing a process of toner-reuse-type toner discharge mode related to the developing part of FIG. 3.

FIG. 12 is a flowchart showing a process of toner-reuse-type toner discharge mode related to the developing part 40 of FIG. 3. When the toner-reuse-type toner discharge mode is started, the controller 8 halts the rotation of the developing roller 44 (step S401). Next, the controller 8 starts drive of the vibration generating part 14 (step S402).

Next, the controller 8 starts blowoff of air present in the duct 61 into the second conveyance chamber 53 by the fan 63 (step S403). In this case, the controller 8 makes the fan 63 rotated reverse at a speed equal to or lower than that of the forward rotation by which the air present in the second conveyance chamber 53 is sucked into the duct 61. The fan

63 is driven for a predetermined specified period. Then, the controller 8 halts the blowoff of the air present in the duct 61 into the second conveyance chamber 53 by the fan 63 (step S404).

Next, the controller 8 halts the drive of the vibration generating part 14 (step S405).

Next, the controller 8 starts suction of air present in the second conveyance chamber 53 into the duct 61 by the fan 63 (step S406). Next, the controller 8 makes the developing roller 44 rotated forward at a half speed (half of normal speed), starting application of the developing voltage by the voltage application part 12 (step S407). It is noted that the rotational speed of the developing roller 44 is not limited to half speed and needs only to be equal to or lower than that during image formation.

Next, the controller 8 halts the rotation of the developing roller 44, and halts the application of the developing voltage by the voltage application part 12 (step S408). Then, the controller 8 halts suction of air present in the second conveyance chamber 53 into the duct 61 by the fan 63 (step S409), ending the process related to FIG. 12.

Figure 13:
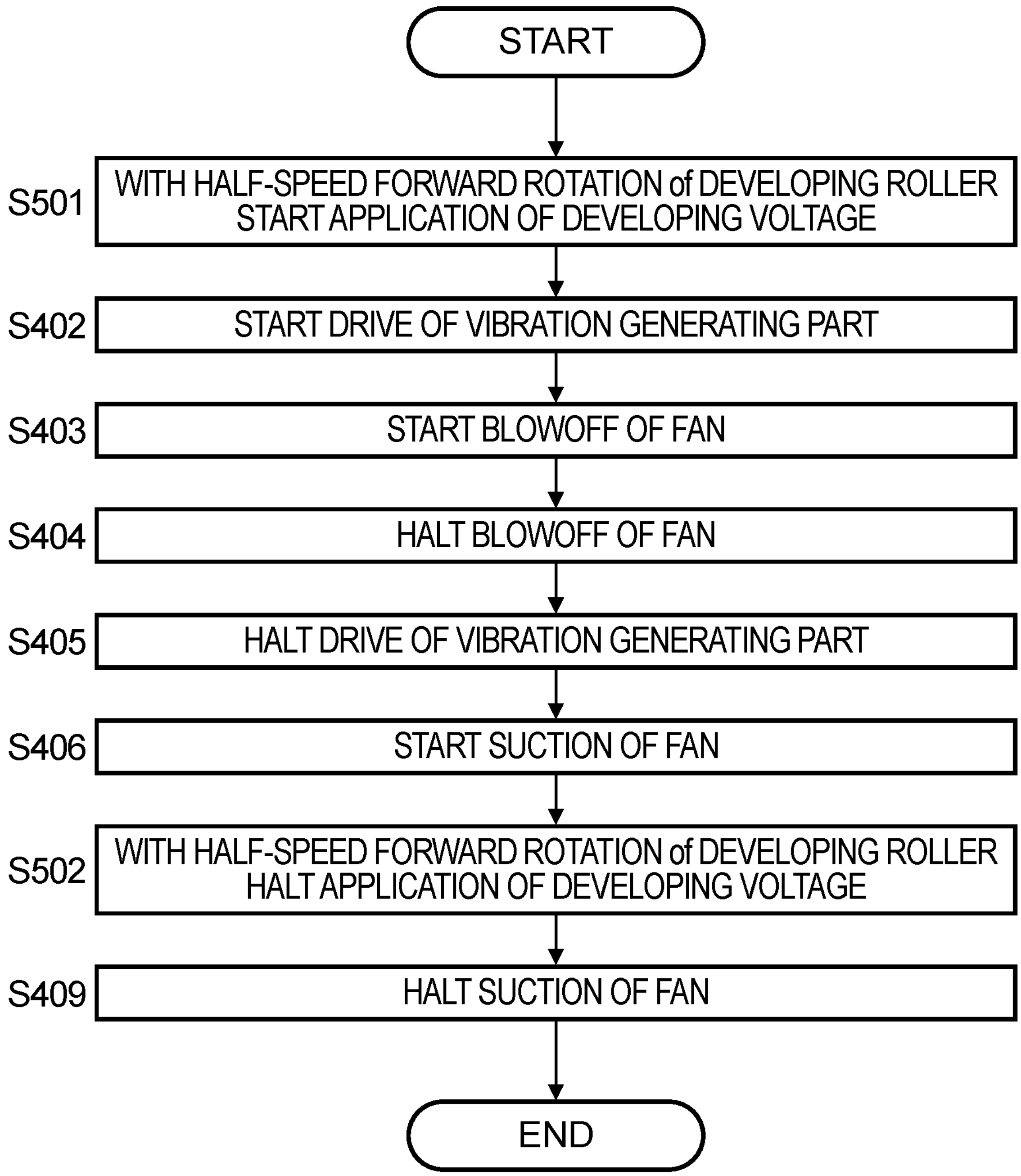
FIG. 13 is a flowchart showing a modification example of the process of the toner-reuse-type toner discharge mode according to FIG. 12.

In addition, FIG. 13 is a flowchart showing a modification example of the process of the toner-reuse-type toner discharge mode related to FIG. 12. As shown in FIG. 13 as a modification example, in the toner-reuse-type toner discharge mode, the developing roller 44 may be rotated forward for a period from vibration start to vibration halt by the vibration generating part 14 (step S501, S502).

As described above, in the toner collection mode and the toner discharge mode both of the toner discard type, the controller 8, after halting rotation of the developing roller 44, executes a vibration start and a vibration halt of the filter 62 by the vibration generating part 14, and thereafter, makes the developing roller 44 rotated reverse. With this configuration, toner dropped or discharged from the toner trapping mechanism 60 can be stored on the magnetic brush in the outer circumferential surface of the rotation-halted developing roller 44. Thereafter, making the developing roller 44 rotated reverse allows scattered toner to be efficiently delivered to the drum cleaning part 23 and discarded.

Also as described above, in the toner collection mode and the toner discharge mode both of the toner reuse type, the controller 8 makes the developing roller 44 rotated at a speed equal to or lower (e.g., half speed) than that during image formation. Further, in the toner-reuse-type control mode, the controller 8 halts the rotation of the developing roller 44 simultaneously with a halt of vibrations of the filter 62 by the vibration generating part 14 or a specified time elapse after a halt of the vibrations of the filter 62. With this configuration, toner dropped or discharged from the toner trapping mechanism 60 can be made more likely to be deposited on the magnetic brush in the outer circumferential surface of the low-speed-rotating developing roller 44. As a result of this, scattered toner can be efficiently delivered to under the second conveyance chamber 53 and reused.

Also as described above, in the toner collection mode, at the time when vibrations are imparted to the filter 62 by the vibration generating part 14, the controller 8 halts the rotation of the fan 63 or makes the fan 63 rotated at a speed lower than that during image formation. With this configuration, toner separated from the filter 62 by making the filter 62 vibrated can be made less likely to be redeposited on the filter 62. Accordingly, it becomes possible to recover the functions of the filter 62 even more effectively.

Also as described above, in the toner discharge mode, the controller 8 makes the fan 63 rotated at a speed equal to or lower than that during image formation. In other words, the controller 8 makes the fan 63 rotated reverse at a speed equal to or lower than that of forward rotation by which air present in the second conveyance chamber 53 is sucked into the duct 61. With this configuration, toner scattering from the development container 50 to outside due to reverse rotation of the fan 63 can be suppressed. That is, it becomes implementable to recover the functions of the filter 62 while suppressing toner scattering from the development container 50 to outside.

Although an embodiment of this disclosure has been fully described hereinabove, yet the disclosure is not limited to the scope of this description and may be modified in various ways unless those modifications depart from the gist of the disclosure.

For example, in the above-described embodiment, the image forming apparatus 1 is assumed as being a tandem-type image forming apparatus for color printing in which images of plural colors are formed in successive superimposition on one another. However, the image forming apparatus is not limited to such models. The image forming apparatus may be a non-tandem-type image forming apparatus for color printing or an image forming apparatus for monochrome printing.

What is claimed is:

1. An image forming apparatus comprising:
- an image carrier for having an electrostatic latent image formed on its outer circumferential surface;
- a charging part for electrically charging the outer circumferential surface of the image carrier;
- a developing part for feeding toner to the outer circumferential surface of the image carrier;
- a cleaning part for cleaning the outer circumferential surface of the image carrier;
- a voltage application part for applying a developing voltage to a developer carrier;
- a vibration generating part for vibrating a filter provided in the developing part; and
- a controller for controlling the image carrier, the charging part, the developing part, the cleaning part, the voltage application part, and the vibration generating part, wherein
- the developing part includes:
  - a development container which includes a first conveyance chamber and a second conveyance chamber placed in parallel juxtaposition and communicated with each other at their longitudinal both end portions and in which a toner-containing developer to be fed to the image carrier is contained;
  - a first conveyance member and a second conveyance member which are rotatably supported by the first conveyance chamber and the second conveyance chamber, respectively, and which convey and circulate the developer, while stirring the developer, in mutually opposite directions of the longitudinal direction;
  - the developer carrier which is rotatably supported by the development container in opposition to the image carrier, and which feeds the toner contained in the second conveyance chamber to the image carrier; and
  - a toner trapping mechanism for trapping the toner contained in the second conveyance chamber, and
- the toner trapping mechanism includes:
  - a duct which is connected to the second conveyance chamber and which allows air present in the second conveyance chamber to flow therethrough;

an air inlet port which is a connecting portion between the duct and the second conveyance chamber and which is placed upward of the developer carrier to be opposed to the developer carrier, the air inlet port being opened along the longitudinal direction of the second conveyance chamber so as to allow air present in the second conveyance chamber to flow into the duct;

an air exhaust port which is placed at a downstream end in an airflow direction of air flowing in through the air inlet port of the duct so as to allow air in the duct to flow out therethrough;

the filter which traps the toner contained in air flowing through the duct; and a fan which allows air present in the second conveyance chamber to be sucked into the duct and let to flow outside, the filter includes:

a first filter covering the air inlet port and opposed to the developer carrier; and a second filter disposed on a downstream side of the first filter in the airflow direction in the duct to cover an airflow cross-section, the second filter having a higher toner trapping efficiency than the first filter, and the vibration generating part is placed outside the developing part so as to be opposed to the development container and positioned on a downstream side in a developer conveyance direction of the second conveyance chamber.

2. The image forming apparatus according to claim 1, wherein the controller boosts drive power for the vibration generating part stepwise or continuously in an initial stage of vibration start for the filter by the vibration generating part.

3. The image forming apparatus according to claim 1, wherein the developer is a two-component developer containing magnetic carrier and the toner, and the development container has a developer discharge port for discharging the developer contained in the development container to outside.

4. The image forming apparatus according to claim 1, wherein the controller is enabled to execute control modes including:

a toner collection mode in which the toner trapped by the filter is deposited and collected on the developer carrier; and a toner discharge mode in which the toner trapped by the filter is discharged from within the duct to the second conveyance chamber side by making the fan rotated reverse.

5. The image forming apparatus according to claim 4, wherein during non-image formation, the controller makes the filter vibrated by the vibration generating part and controls the charging part and the voltage application part so as to generate a potential difference in such a direction that the toner is moved from the developer carrier to the image carrier, and moreover the controller makes the developer carrier rotated in a direction reverse to that during image formation and also makes the image carrier rotated in a direction identical to that during image formation, whereby the controller is enabled to execute the toner collection mode and the toner discharge mode both of toner discard type in which the toner is discarded by the cleaning part via the image carrier.

6. The image forming apparatus according to claim 4, wherein during non-image formation, the controller makes the filter vibrated by the vibration generating part and makes the developer carrier rotated in a direction identical to that during image formation, whereby the controller is enabled to execute the toner collection mode and the toner discharge mode both of toner reuse type in which the toner is returned to within the second conveyance chamber and reused.

7. The image forming apparatus according to claim 5, wherein in the toner collection mode and the toner discharge mode both of the toner discard type, the controller, after halting rotation of the developer carrier, executes start and halt of vibrations of the filter by the vibration generating part to make the developer carrier rotated reverse.

8. The image forming apparatus according to claim 6, wherein in the toner collection mode and the toner discharge mode both of the toner reuse type, the controller makes the developer carrier rotated at a speed equal to or lower than that during image formation and halts the rotation of the developer carrier simultaneously with a halt of vibrations of the filter by the vibration generating part or a specified time elapse after the halt of the vibrations of the filter.

9. The image forming apparatus according to claim 4, wherein in the toner collection mode, when vibrations are imparted to the filter by the vibration generating part, the controller makes rotation of the fan halted or makes the fan rotated at a speed lower than that during image formation.

10. The image forming apparatus according to claim 4, wherein in the toner discharge mode, the controller makes the fan rotated at a speed equal to or lower than that during image formation.

11. The image forming apparatus according to claim 4, wherein the controller executes the toner collection mode and the toner discharge mode in an order of firstly the toner collection mode and then the toner discharge mode.

* * * * *